United States Patent
Law et al.

(10) Patent No.: US 10,055,867 B2
(45) Date of Patent: Aug. 21, 2018

(54) ACCELERATED LIGHT FIELD DISPLAY

(71) Applicant: QUALCOMM Incorporated, San Diego, CA (US)

(72) Inventors: Henry Hing Law, Scarborough (CA); Tung Chuen Kwong, Richmond Hill (CA); Benjamin Koon Pan Chan, Markham (CA); William Lloyd Atkinson, Markham (CA); Wilson Hung Yu, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 15/137,981

(22) Filed: Apr. 25, 2016

(65) Prior Publication Data
US 2017/0309049 A1 Oct. 26, 2017

(51) Int. Cl.
*G06T 11/20* (2006.01)
*H04N 13/363* (2018.01)
(Continued)

(52) U.S. Cl.
CPC .......... *G06T 11/60* (2013.01); *G02B 27/0101* (2013.01); *G02B 27/0179* (2013.01); *G06K 9/42* (2013.01); *G06T 7/0075* (2013.01); *G06T 15/04* (2013.01); *G06T 15/205* (2013.01); *G06T 15/30* (2013.01); *H04N 13/156* (2018.05); *H04N 13/204* (2018.05); *H04N 13/275* (2018.05); *H04N 13/307* (2018.05); *H04N 13/363* (2018.05); *G02B 2027/014* (2013.01);
(Continued)

(58) Field of Classification Search
CPC ....... G06T 11/60; G06T 7/0075; G06T 15/04; G06T 15/205; G06T 15/30; G06T 2207/30252; G06T 2215/16; G06T 13/80; G02B 27/0101; G02B 27/0179; G02B 2027/014; G02B 2027/0185; G06K 9/42; H04N 13/0203; G09G 5/14; G09G 2360/121; G09G 5/363; G09G 5/39; G09G 5/397; G09G 5/399; G06Q 30/0276
See application file for complete search history.

(56) References Cited

U.S. PATENT DOCUMENTS 9,030,749 B2 5/2015 Lescure et al.
9,064,420 B2 6/2015 Beckwith et al.
(Continued)

OTHER PUBLICATIONS

Sol, OpenGL 101: Matrices—projection, view, model, May 2013, URL: https://solarianprogrammer.com/2013/05/22/opengl-101-matrices-projection-view-model/.*
(Continued)

*Primary Examiner* — Mark K Zimmerman
*Assistant Examiner* — Phuc N Doan
(74) *Attorney, Agent, or Firm* — Shumaker & Sieffert, P.A.

(57) ABSTRACT

This disclosure describes methods, techniques, devices, and apparatuses for graphics and display processing for light field projection displays. In some examples, this disclosure describes a projection display system capable of rendering and displaying multiple annotations at the same time. An annotation is any information (e.g., texts, signs, directions, logos, phone numbers, etc.) that may be displayed. In one example, this disclosure proposes techniques for rendering and displaying multiple annotations at the same time at multiple different focal lengths.

22 Claims, 18 Drawing Sheets

(51) Int. Cl.

| | | |
|---|---|---|
| *G06T 11/60* | (2006.01) | |
| *H04N 13/204* | (2018.01) | |
| *G02B 27/01* | (2006.01) | |
| *G06K 9/42* | (2006.01) | |
| *G06T 7/00* | (2017.01) | |
| *G06T 15/04* | (2011.01) | |
| *G06T 15/20* | (2011.01) | |
| *G06T 15/30* | (2011.01) | |
| *H04N 13/275* | (2018.01) | |
| *H04N 13/156* | (2018.01) | |
| *H04N 13/307* | (2018.01) | |

(52) U.S. Cl.
CPC ............... *G02B 2027/0185* (2013.01); *G06T 2207/30252* (2013.01); *G06T 2215/16* (2013.01)

(56) References Cited

U.S. PATENT DOCUMENTS

| | | | |
|---|---|---|---|
| 2003/0169277 A1* | 9/2003 | Patton | G06T 15/30 345/620 |
| 2012/0224060 A1 | 9/2012 | Gurevich et al. | |
| 2012/0249831 A1* | 10/2012 | Porter | H04N 5/23206 348/231.3 |
| 2013/0328896 A1* | 12/2013 | Belanger | G06T 1/60 345/531 |
| 2014/0036374 A1* | 2/2014 | Lescure | G02B 27/0101 359/630 |
| 2014/0063064 A1* | 3/2014 | Seo | G08G 1/166 345/633 |
| 2014/0145931 A1* | 5/2014 | Kim | B60K 35/00 345/156 |
| 2014/0168265 A1* | 6/2014 | Ahn | B60R 1/00 345/633 |
| 2014/0168783 A1 | 6/2014 | Luebke et al. | |
| 2014/0340304 A1* | 11/2014 | Dewan | G06T 13/80 345/156 |
| 2014/0340389 A1 | 11/2014 | Lanman et al. | |
| 2014/0354691 A1* | 12/2014 | Hing | G02B 27/01 345/633 |
| 2015/0070502 A1* | 3/2015 | Murayama | B60R 1/00 348/148 |
| 2015/0116468 A1* | 4/2015 | Au | H04N 13/04 348/54 |
| 2015/0123993 A1* | 5/2015 | Ohba | G09G 5/00 345/629 |
| 2015/0189266 A1 | 7/2015 | Zhou | |
| 2016/0140760 A1* | 5/2016 | Bowden | G06T 19/006 345/633 |
| 2016/0210719 A1* | 7/2016 | Pelton | G06T 1/20 |

OTHER PUBLICATIONS

"Continental Head-up Display Augmented Reality HUD," Continental Automotive GmbH-Legal/Imprint, retrieved on Sep. 2, 2015 from http://continental-head-up-display.com/, 2014, 15 pp. (Applicant points out, in accordance with MPEP 609.04(a), that the year of publication, 2014, is sufficiently earlier than the effective U.S. filing date, Apr. 25, 2016, so that the particular month of publication is not in issue.).

Yoshida, Junko, "Is Head up Display Future ADAS Screen?" EE Times Connecting the Global Electronics Community, http://www.eetimes.com/document.asp?doc_id=1326349, Apr. 15, 2015, 6 pp.

Previc et al., "Spatial Disorientation in Aviation," Progress in Astronautics and Aeronautics; American Institute of Aeronautics and Astronautics; 2004, 452 pp. (Applicant points out, in accordance with MPEP 609.04(a), that the year of publication, 2014, is sufficiently earlier than the effective U.S. filing date, Apr. 25, 2016, so that the particular month of publication is not in issue.).

Bark et al., "Personal Navi: Benefits of an Augmented Reality Navigational Aid Using a See-Thru 3D Volumetric HUD," 2014, 8 pp. (Applicant points out, in accordance with MPEP 609.04(a), that the year of publication, 2014, is sufficiently earlier than the effective U.S. filing date, Apr. 25, 2016, so that the particular month of publication is not in issue.).

Everitt et al., "OVR_multiview," https://www.khronos.org/registry/OpenGL/extensions/OVR/OVR_multiview.txt, Jul. 1 2016, 7 pp.

Buckley et al., "Full colour holographic laser projector HUD," Light Blue Optics Ltd., Sep. 2, 2015, 5 pp.

International Search Report and Written Opinion—PCT/US2017/021584—ISA/EPO—dated Jun. 6, 2017, 14 pp.

Response to the Written Opinion dated Jun. 6, 2017, in International Application No. PCT/US2017/021584 filed Sep. 21, 2017, 17 pp.

International Preliminary Report on Patentability of International Application No. PCT/US2017/021584 dated Feb. 20, 2018, 6 pp.

\* cited by examiner $$\begin{bmatrix} Right\_x & Up\_x & Look\_x & 0 \\ Right\_y & Up\_y & Look\_y & 0 \\ Right\_z & Up\_z & Look\_z & 0 \\ -(Right*Position) & -(Up*Position) & -(Look*Position) & 1 \end{bmatrix}$$

View Matrix (V)

FIG. 11

$$P = \begin{bmatrix} (2\times Near)/(right-left) & 0 & (right+left)/(right-left) & 0 \\ 0 & (2\times Near)/(top-bottom) & (top+bottom)/(top-bottom) & 0 \\ 0 & 0 & (Near+Far)/(Near-Far) & (2\times Far \times Near)/(Near-Far) \\ 0 & 0 & 0 & 0 \end{bmatrix}$$

Projection Matrix (P)

FIG. 12

ACCELERATED LIGHT FIELD DISPLAY

TECHNICAL FIELD

This disclosure relates to techniques for graphics and display processing for projection displays.

BACKGROUND

Light field projection displays may be used in many applications, including heads-up displays for automotive applications, heads-up displays for avionics application, augmented reality applications, virtual reality applications, and holographic display applications, among others. In many projection display applications, information (e.g., one or more annotations) is displayed to a user at a fixed focal length. Graphics processing units (GPUs) may be used to render such annotations.

SUMMARY

In general, this disclosure describes methods, techniques, devices, and apparatuses for graphics and display processing for light field projection displays. In some examples, this disclosure describes a projection display system capable of rendering and displaying multiple annotations at the same time. An annotation is any information (e.g., texts, signs, directions, logos, phone numbers, etc.) that may be displayed. In one example, this disclosure proposes techniques for rendering and displaying multiple annotations at the same time at multiple different focal lengths.

In some examples, the focal length of an annotation is selected to match the focal distance to a real-world object. In this way, annotations may be displayed to a user at the same focal distance the user is likely to be focusing their eyesight. Matching the focal length of an annotation the focal distance to a real-world object generally provides a better user experience. For automotive/avionics heads-up display applications, matching the focal length of an annotation to the focal distance of a real-world object may provide for fewer distractions, and thus a safer operating environment, as a user may not need to continually refocus their attention back and forth between real-world objects and displayed annotations.

In other examples of the disclosure, the distance and/or focal distance to a real-world object may be continually updated. In this way, annotations may also be rendered at a continually updated focal distance so that the focal distance to the annotation and the real-world object are maintained as the same. This disclosure also describes graphics processing techniques for accelerating the generation of multiple annotations at different focal lengths. In addition, this disclosure also discloses display processing techniques for accelerating the processing and read out of frames for the projection display. In one example, this disclosure describes a method for information display, the method comprising determining a distance to an object, calculating a focal length for displaying a first annotation with a display based on the distance, and displaying, with the display, the first annotation at the focal length.

In another example, this disclosure describes an apparatus for information display, the apparatus comprising a memory configured to store annotations, and one or more processors configured to determine a distance to an object, calculate a focal length for displaying a first annotation with a display based on the distance, and display the first annotation at the focal length.

In another example, this disclosure describes an apparatus information display, the apparatus comprising means for determining a distance to an object, means for calculating a focal length for displaying a first annotation with a display based on the distance, and means for displaying the first annotation at the focal length.

In another example, this disclosure describes a computer-readable storage medium storing instructions that, when executed, cause one or more processors to determine a distance to an object, calculate a focal length for displaying a first annotation with a display based on the distance, and display the first annotation at the focal length.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 11 is a conceptual diagram showing an example view matrix.

FIG. 12 is a conceptual diagram showing an example projection matrix.

DETAILED DESCRIPTION

This disclosure is related to techniques for displaying information (e.g., text, objections, signs, instructions, or more generally, annotations) on a display. In some examples, this disclosure describes techniques related to displaying one or more annotations on using a light field projection display. In some examples, light field projection displays are configured to display annotations at one or more fixed focal lengths. In heads-up display (HUD) applications, such a technique may be distracting, as the displayed annotations may be at different focal lengths than real-world objects. This situation may force a user to constantly change their focus between displayed annotations and real-world objects, thus causing distractions and a poor user experience.

In view of these drawbacks, this disclosure proposes techniques whereby one or more annotations may be displayed at different focal lengths. In one example, one or more annotations may be displayed at focal lengths that match the focal length to a real-world object, thus providing less distraction to a user. In some examples, the techniques of this disclosure include determining a distance to the real-world object such that the focal length of a displayed annotation may be continuously updated. This disclosure also describes graphics processing techniques for accelerating the generation of multiple annotations at different focal lengths. In addition, this disclosure also discloses display processing techniques for accelerating the processing and read out of frames for the projection display.

Figure 1:
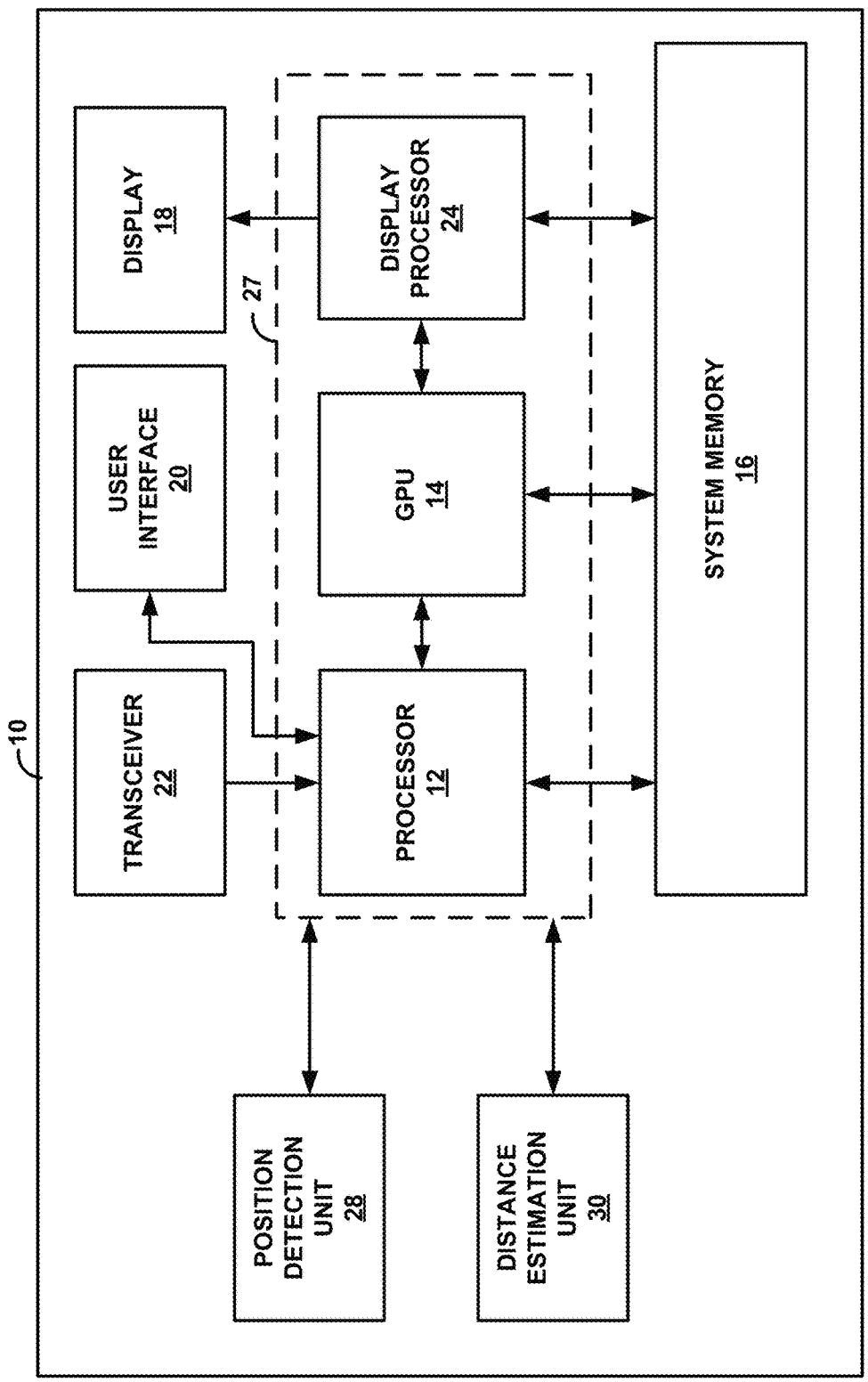
FIG. 1 is a block diagram illustrating an example device according to the techniques of the disclosure.

FIG. 1 is a block diagram illustrating an example device for processing data for display on a projection display in accordance with one or more example techniques described in this disclosure. In the example of FIG. 1, system 10 includes processor 12, graphics processing unit (GPU) 14, display processor 24, and system memory 16. In some examples, processor 12, GPU 14, and display processor 24 may be formed as an integrated circuit (IC) 27. For example, IC 27 may be considered as a processing chip within a chip package, such as a system on chip (SoC). In some examples, processor 12, GPU 14, and display processor 24 may be housed in different integrated circuits (e.g., different chip packages).

Examples of processor 12, GPU 14, and display processor 24 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of system 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks).

Display processor 24 may be a processor specifically configured to perform operations on data to be displayed. For example, display processor 24 may be configured to perform 2D operations on one or more images produced by GPU 14 and processor 12 prior to sending such images to display 18. Examples of 2D operations may include rotation, scaling, stretching, compositing, blending, and other operations. In addition, display processor 24 may be configured to convert images from an input data format to an output data format that is compatible with display 18. As will be explained in more detail below, display processor 24 may be configured to convert an image produced by GPU 14 that is in a multiview tile format into a light field tile format that is compatible with light field projections displays (e.g., in the case that display 18 is a light field projection display). Since display processor 24 is dedicated hardware configured to accelerate such 2D operations, display processor 24 may be able to more quickly perform such a conversion compared to a software process executing on GPU 14 or processor 12. As such, the frame rate of images displayed by display 18 may be increased.

It should be understood that display processor 24 may be implemented as a central processing unit, a DSP, a GPU, as an ASIC, as an FGPA, or as any other combination of programmable and/or fixed function circuits. In this regard, in some examples, IC 27 may not include a separate display processor 24, but rather, the functions of display processor 25 may be performed by processor 12 and/or GPU 14. For purposes of illustration, example techniques described in this disclosure are described with respect to processor 12, GPU 14, and/or display processor 24. However, the techniques described in this disclosure are not so limited. The techniques described in this disclosure may be extended to other types of processing units (e.g., processing units that provide massive parallel processing capabilities, even if not for graphics processing). Also, the techniques described in this disclosure may be extended to processing units not specifically configured for parallel processing.

Processor 12 may execute various types of applications. Examples of the applications include operating systems, web browsers, e-mail applications, spreadsheets, video games, or other applications that generate viewable objects for display. In examples of this disclosure, processor 12 may be configured to execute applications for displaying information using a projection display. Such applications may include HUDs for automobiles, HUDs for aircraft, retinal displays for augmented reality (AR) applications, other projection displays for augmented reality (AR) applications, virtual reality (VR) applications, or any other application in which information may be displayed to a user at multiple different focal distances. For example, the techniques of this application may be used in conjunction with eyeglasses or goggles that may include a display capable of displaying annotations and different focal distances (e.g., for a motorcyclist, skier, etc.). As will be explained in more detail below with reference to FIGS. 2-5, rendering and displaying information at multiple different focal distances allows system 10 to match the focal distance of displayed information to the focal distance of multiple different real-world objects. System 10 may also be configured to continuously update the focal distance to real-world objects, and accordingly, continually update and render annotations at focal distances to match the real-world objects as system 10 is in motion (e.g., in an automobile HUD application).

The information displayed by system 10 may be any type of information, including text, symbols, video, 3-D graphics, or the like. In general, for augmented reality and/or heads-up display application, such information may be referred to as annotations. In such contexts, the annotations convey information to user about the world around the user. For example, the annotations may include vehicle information (current speed, GPS location, fuel mileage, fuel levels, etc.), driving rules (speed limits, one way routes, etc.), routing information (turn directions, distance to next turn, road numbers exit numbers), points-of-interest (POI) information (business logos, business names, telephone numbers, business ratings, caller id, smart phone notifications, collision/accident avoidance indicator, etc.) or another other information about the user's surroundings.

System memory 16 may store instructions for execution of the one or more applications. The execution of an application on processor 12 causes processor 12 to produce graphics data for image content that is to be displayed. In examples of this disclosure, an application executing on processor 12 may cause one or more annotations to be displayed at varying different focal lengths. Processor 12 may transmit graphics data of the image content to GPU 14 for further processing. System memory 16 may also include a framebuffer configured to store the frame(s) of information to be displayed by display 18.

As an example, the execution of an application on processor 12 causes processor 12 to produce vertices of primitives, where the interconnection of primitives at respective vertices forms a graphical object (e.g., an annotation). In this example, the graphics data that processor 12 produces are the attribute data for the attributes of the vertices. For example, the application executing on processor 12 may generate color values, opacity values, coordinates, etc. for the vertices, which are all examples of attributes of the vertices. There may be additional attributes as well, and in some examples, the application need not produce all of the example attributes. In general, the techniques are extendable to data types (e.g., counters) other than attribute data, and the techniques should not be considered limited to attribute data or limited to examples of attribute data such as color values, opacity values, coordinates, etc.

In some non-graphics related examples, processor 12 may generate data that is better suited to be processed by GPU 14. Such data need not be for graphics or display purposes. For instance, processor 12 may output data on which matrix operations need to be performed by GPU 14, and GPU 14 may in turn perform the matrix operations.

In general, processor 12 may offload processing tasks to GPU 14, such as tasks that require massive parallel operations. As one example, graphics processing requires massive parallel operations, and processor 12 may offload such graphics processing tasks to GPU 14. However, other operations such as matrix operations may also benefit from the parallel processing capabilities of GPU 14. In these examples, processor 12 may leverage the parallel processing capabilities of GPU 14 to cause GPU 14 to perform non-graphics related operations.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™ API; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

As will be explained in more detail below, in accordance with the techniques of this disclosure, processor 12 may provide commands to GPU 14 using a specialized API that allows for the efficient processing of multiple annotations at multiple different focal lengths. To render the annotations for display by a light field projection display, rendering of the annotations may use multiple virtual camera angles. In one example, up to 25 different camera angles may be used to render the annotations depending on the locations of the annotations in the projected light field. In accordance with the techniques of this disclosure, a graphics driver being executed by processor 12 may be configured to provide a multiview viewport and model, view, and projection (MVP) matrices to GPU 14 for a particular camera angle, along with the commands for rendering the scene at the that camera angle. In one example, the GPU driver may include commands specific to the particular camera angle in one buffer and commands that are common to all camera angles in another buffer. In this way, the commands that are common to all camera angles need only be generated once and may be reused by all camera angles.

System 10 may also include display 18, user interface 20, transceiver module 22, position detection unit 28, and distance estimation unit 30. System 10 may include additional modules or units not shown in FIG. 1 for purposes of clarity. For example, system 10 may include a speaker and a microphone, neither of which are shown in FIG. 1, to effectuate telephonic communications in some examples. Furthermore, the various modules and units shown in system 10 may not be necessary in every example of system 10. For example, user interface 20 and display 18 may be external to system 10 in some examples.

Display 18 may be any type of light field projection display, retinal display, holographic display, or any other type of display where multiple annotations may be displayed to the user at multiple different focal lengths. In one example, display 18 may include an underlying display that may be a liquid crystal display (LCD), a digital light projection (DLP) display, a light emitting diode (LED) display, an organic LED (OLED) display, a cathode ray tube (CRT) display, or any other type of display for generating pixel values. To generate the light field, the pixels generated by the underlying display may be projected through a pinhole mask, a lenslet array or any other mechanism that directs light to different angles. The light field produced by the lenslet array or pinhole mask is directed at a combiner. The combiner may be a flat piece of glass or other mechanism (e.g., a beam splitter) that collimates the light and projects the light field back at the user within the user's field of view (e.g., in the windshield of an automobile). It should be understood that the above description is just one example, and that any type of projection display capable of displaying annotations at multiple different focal lengths may be used in conjunction with the techniques of this disclosure.

Examples of user interface 20 include, but are not limited to, a trackball, a mouse, a keyboard, and other types of input devices. User interface 20 may also be a touch screen and may be incorporated as a part of display 18. Transceiver module 22 may include circuitry to allow wireless or wired communication between system 10 and another device or a network. Transceiver module 22 may include modulators, demodulators, amplifiers and other such circuitry for wired or wireless communication.

System memory 16 may be the memory for system 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12, GPU 14, and display processor 24 to perform the functions ascribed in this disclosure to processor 12, GPU 14, and display processor 24. Accordingly, system memory 16 may be a computer-readable storage medium having instructions stored thereon that, when executed, cause one or more processors to perform various functions.

In some examples, system memory 16 may be a non-transitory storage medium. The term "non-transitory" may indicate that the storage medium is not embodied in a carrier wave or a propagated signal. However, the term "non-transitory" should not be interpreted to mean that system memory 16 is non-movable or that its contents are static. As one example, system memory 16 may be removed from system 10, and moved to another device. As another example, memory, substantially similar to system memory 16, may be inserted into system 10. In certain examples, a non-transitory storage medium may store data that can, over time, change (e.g., in RAM).

For example, as described in more detail elsewhere in this disclosure, system memory 16 may store the code for a compiler that executes on processor 12 that performs techniques of one or more examples described in this disclosure. System memory 16 may also store code for shader programs (e.g., a vertex shader, a pixel or fragment shader, a compute shader, etc.) that execute on a shader core of GPU 14.

Position detection unit 28 may be configured to detect the current location of system 10, as well as the current location of any POI in the vicinity of system 10. As will be explained in more detail below, position detection unit 28 may include a position/location receiver (e.g., a global positioning system (GPS) receiver) as well as a database of locations of POI. In this way, system 10 may be configured to determine a current distance between system 10 and a particular POI (e.g., a business, an intersection, etc.), calculate a focal length to display an annotation concerning the POI, and display the annotation at a focal length that matches the focal length to the POI (i.e., the focal length of the displayed annotation matches the focal length to the real-world object).

Position detection unit 28 may also access other information concerning system 10 that would aid in determining and updating the distance between system 10 and a real-world object. For example, in an automotive application, position detection unit 28 may also be configured to access automobile operational information, such as intended route (e.g., when using a routing application), route path, vehicle speed, acceleration, and the like.

Distance estimation unit 30 may be configured to calculate the distance between system 10 and other real-world objects whose locations may not be available in a database. For example, in an automotive context, distance estimation unit 30 may be used to calculate the distance between system 10 and other automobiles, the distance between system 10 and road signs, the distance between system 10 and pedestrians, and more generally the distance between system 10 and any other obstructions or objects within the vicinity of system 10. Distance estimation unit 30 may use any techniques for detecting the distance between system 10 and other real-world objects. For example, for detecting the distance between system 10 and another automobile, distance estimation unit 30 may include stereoscopic cameras. Distance estimation unit 30 may use computer vision and/or other image processing techniques to determine the distance to another automobile based on the images produced by the stereoscopic images. However, it should be understood that any techniques for determining a distance between system 10 and other real-world objects may be used in conjunction with the techniques of this disclosure.

System 10 may be used in any application where the display of multiple annotations at multiple different focal lengths may be desired. For example, system 10 may be incorporated into an automobile and may be used to drive a heads-up display. As another example, system 10 may be incorporated into an aircraft and be used to drive an aviation heads-up display. As still another example, system 10 may be incorporated into, or used in conjunction with a retinal display system. For example, system 10 may be used in conjunction with a retinal projector incorporated into glasses or other types of headgear or wearable displays. System 10 may also be incorporated into mobile phones, tablets, laptop computers, desktop computers, set top boxes, or any other computing environment.

In accordance with one or more examples of this disclosure, as will be explained in more detail below, system 10 may be configured to determine a distance to an object, calculate a focal length for displaying a first annotation with a display based on the distance, and display the first annotation at the focal length. In a further example of the disclosure, system 10 may be configured to determine an updated distance to the object, calculate an updated focal length for displaying the first annotation based on the updated distance, and display the first annotation with the display at the updated focal length.

In other examples of the disclosure, system 10 may be configured to display multiple annotations. In such examples, system 10 may be further configured to determine respective focal lengths for one or more additional annotations, the one or more additional annotations being different than the first annotation, and display the one or more additional annotations at their respective focal lengths.

Figure 2:
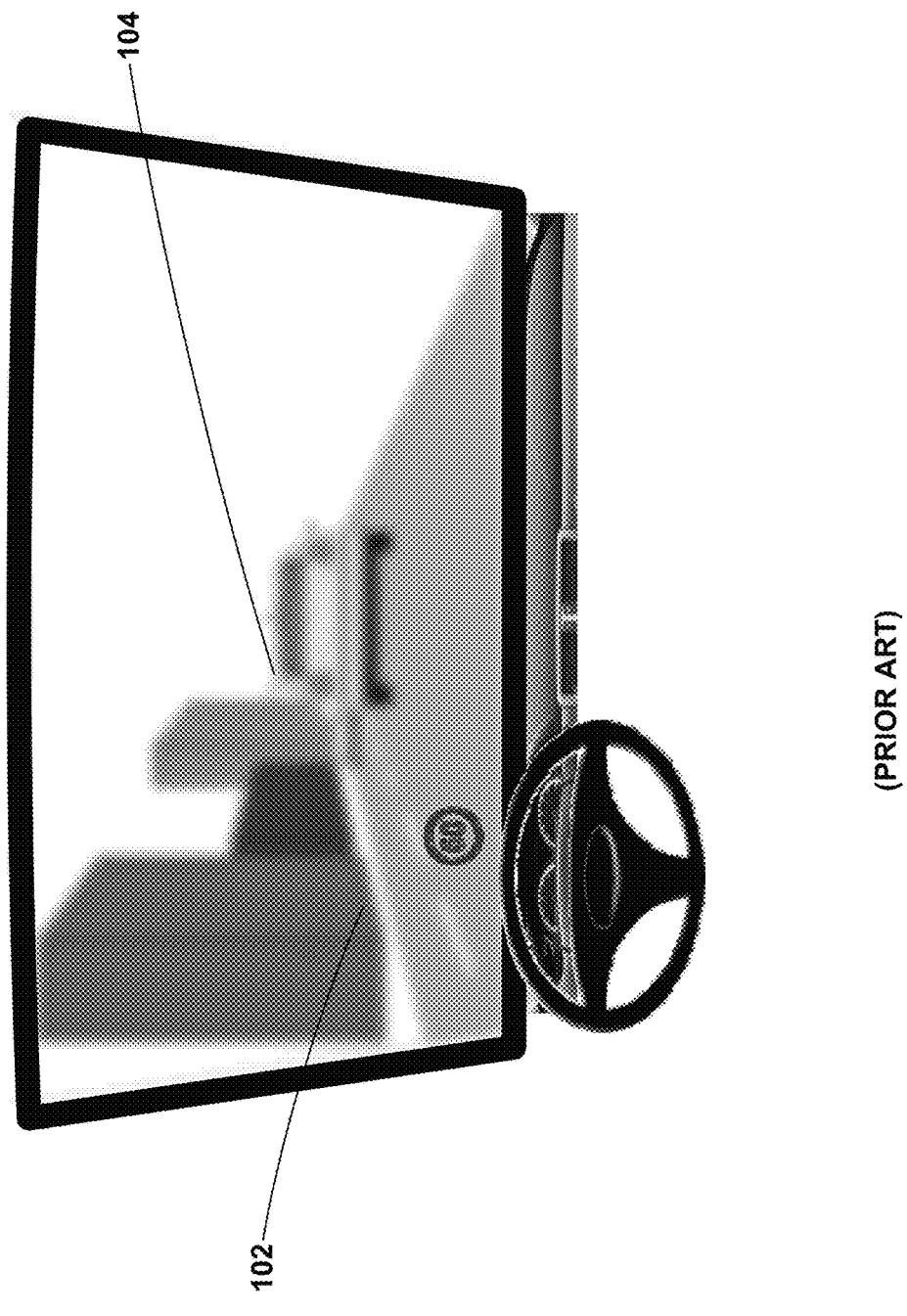
FIG. 2 is a conceptual diagram illustrating an example heads-up projection display with a single annotation.

FIG. 2 is a conceptual diagram illustrating an example heads-up projection display with a single annotation. The example of FIG. 2 shows an example of a HUD in an automotive application. FIG. 2 shows an annotation 102 that is displayed at a fixed distance. In this example, annotation 102 is the current speed of an automobile ("60"). However, annotation 102 may be any kind of information. As can be seen in FIG. 2, annotation 102 is at a different focal distance than vehicle 104 as vehicle 104 is shown out of focus. In typical driving situations, a driver is most likely focusing their eyesight at a point in the distance, and in many situations that point is the vehicle directly in front of them (e.g., vehicle 104).

As such, in order to discern the information conveyed by annotation 102 a driver must adjust their focus from vehicle 104 to annotation 102. This forces a driver to continually change their eyesight focus between a driving focal distance (e.g., the focal distance of vehicle 104) and a focal distance for viewing annotation. Such changes in driver focus my cause significant distraction for the driver.

Figure 3:
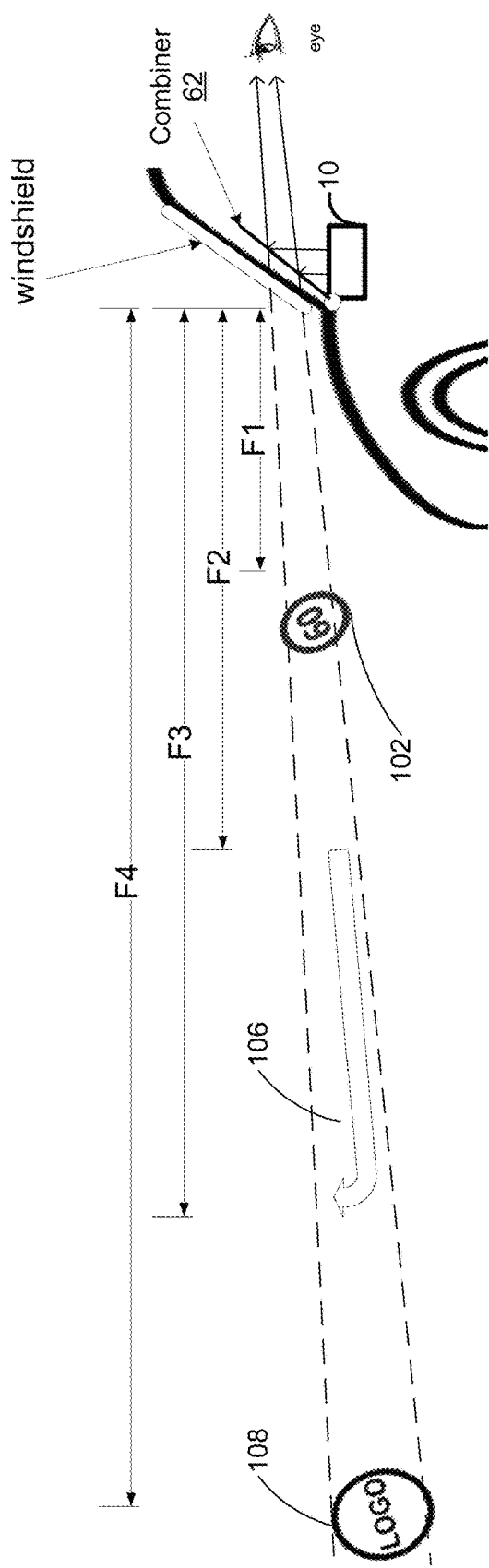
FIG. 3 is a conceptual diagram illustrating a projection display system according to the techniques of this disclosure showing multiple annotations at different focal lengths.

FIG. 3 is a conceptual diagram illustrating a projection display system according to the techniques of this disclosure showing multiple annotations at different focal lengths. As shown in FIG. 3, system 10 may be configured to display the multiple annotations 102, 106, and 108 in the field of view of an operator of a vehicle. Annotation 102 may be vehicle information (e.g., vehicle speed), annotation 106 may be routing directions (e.g., a turn instruction), and annotation 108 may be information concerning a business (e.g., a business logo). System 10 may include a light field projection display (e.g., display 18 of FIG. 1) that is configured to project a light field at combiner 62 (e.g., an optical combiner). Note that in some examples, combiner 62 may be part of display 18. Combiner 62 redirects the light field toward a user's eye in the users expected field of view (e.g., through a windshield of a car).

In accordance with one example technique of the disclosure, system 10 may be configured to render and display multiple different annotations at multiple different focal lengths. For example, annotation 102 may be displayed at focal length F1, annotation 106 may be displayed between focal lengths F2 and F3, and annotation 108 may be displayed at focal length F4.

As will be discussed in the examples below, the techniques of this disclosure not only allow for the display of annotations at multiple focal lengths, but the focal lengths of displayed annotations may be matched to the focal length of real-world objects. In addition, in other examples of the disclosure, the focal lengths of displayed annotations may be continuously updated to match the focal length to real-world objects as the user and/or system 10 moves.

Figure 4:
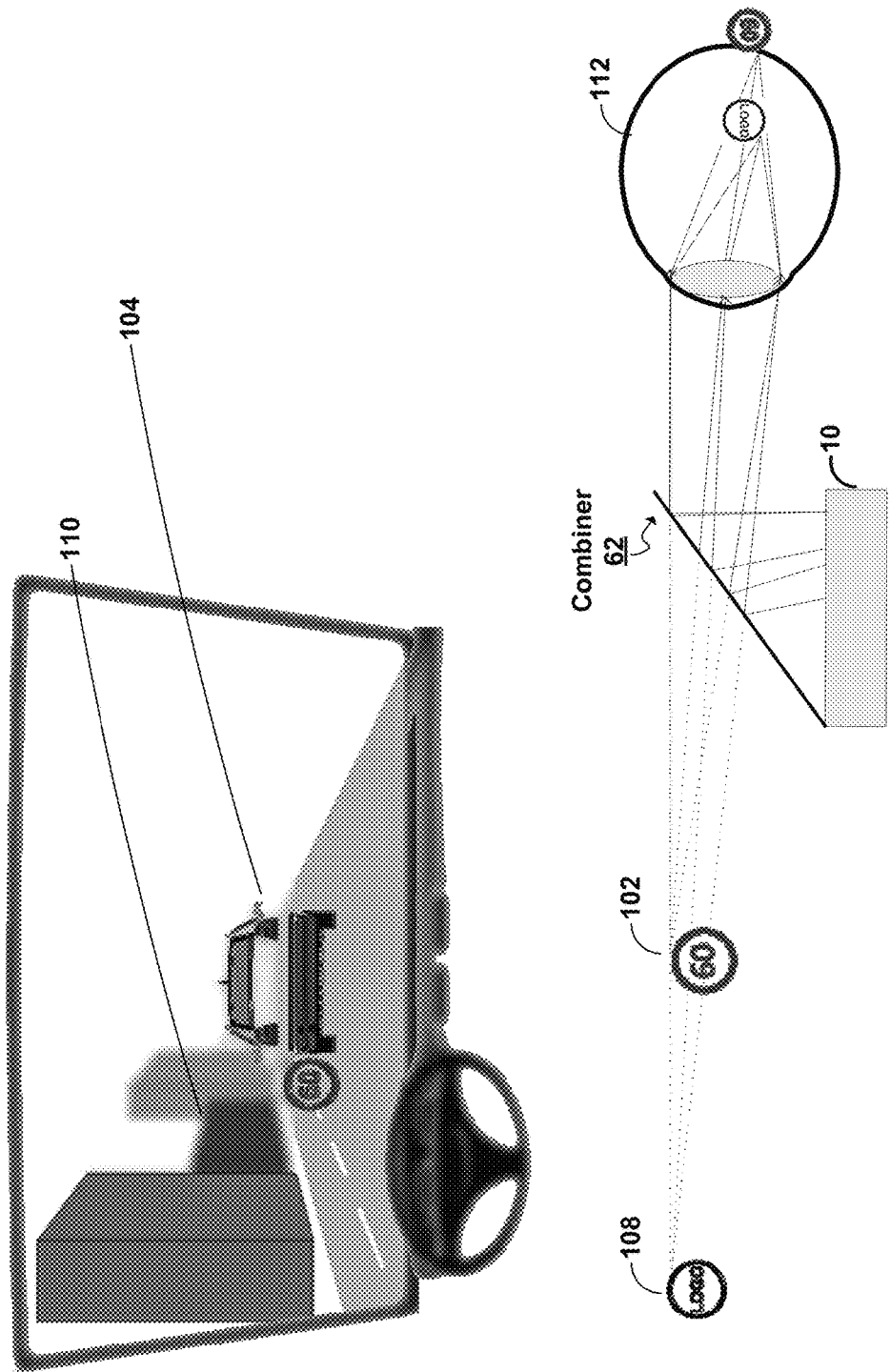
FIG. 4 is a conceptual diagram illustrating a projection display system according to the techniques of this disclosure showing two annotations at different focal lengths.

FIG. 4 is a conceptual diagram illustrating a projection display system according to the techniques of this disclosure showing two annotations at different focal lengths matched to the distance to real-world objects. As shown in FIG. 4, annotation 102 is displayed at the same focal length as vehicle 104 (i.e., a real-world object). As discussed above with reference to FIG. 1, distance estimation unit 30 may be configured to determine the distance to vehicle 104 and use such a determined to distance to calculate the focal length for displaying annotation 102. As can be seen in FIG. 4, when the driver focuses their eyesight on vehicle 104, both vehicle 104 and annotation 102 are in focus.

Note, in this example the focal distance for displaying annotation 102 is based on an assumption that a driver may typically focus their eyesight on the vehicle directly in front of the user. In other examples, system 10 may be configured to display annotation 102 (or any other annotation relating to vehicle or GPS information) at a focal distance a driver typically focuses their eyesight so as to avoid driver distraction. Such a focal distance may be fixed, may be user-configurable, or may be continuously updated to match a real-world object (e.g., vehicle 104).

Furthermore, as shown in FIG. 4, annotation 108 (e.g., a business logo) is displayed at the same focal distance of the physical location 110 of the POI (e.g., the physical store) associated with annotation 108. In the example of FIG. 4, the user is focusing their eyesight on vehicle 104. As such, both physical location 110 and annotation 108 are out of focus. This situation is depicted by eye 112 where the portion of the light field displaying annotation 102 is focused on the retina of eye 112, but the portion of the light field displaying annotation 108 is not focused on the retina of eye 112.

Figure 5:
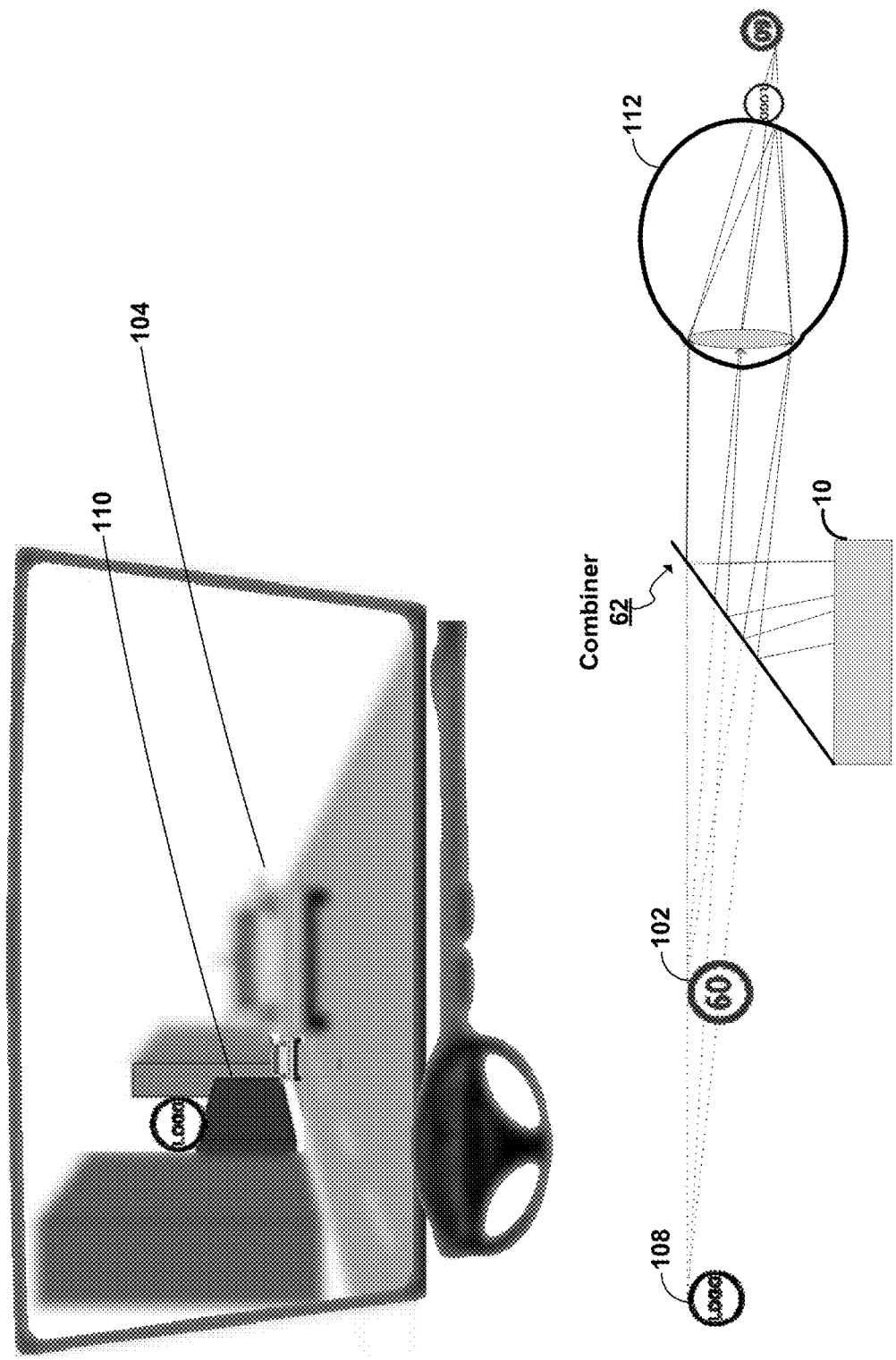
FIG. 5 is a conceptual diagram illustrating a projection display system according to the techniques of this disclosure showing two annotations at different focal lengths.

FIG. 5 is a conceptual diagram illustrating a projection display system according to the techniques of this disclosure showing two annotations at different focal lengths matched to real-world objects. In the example of FIG. 5, the user has changed the focus of their eyesight to physical location 110. In this example, both physical location 110 and the associated annotation 108 are in focus, while vehicle 104 and annotation 102 are not in focus. This situation is depicted by eye 112 where the portion of the light field displaying annotation 108 is focused on the retina of eye 112, but the portion of the light field displaying annotation 102 is not focused on the retina of eye 112.

Figure 6:
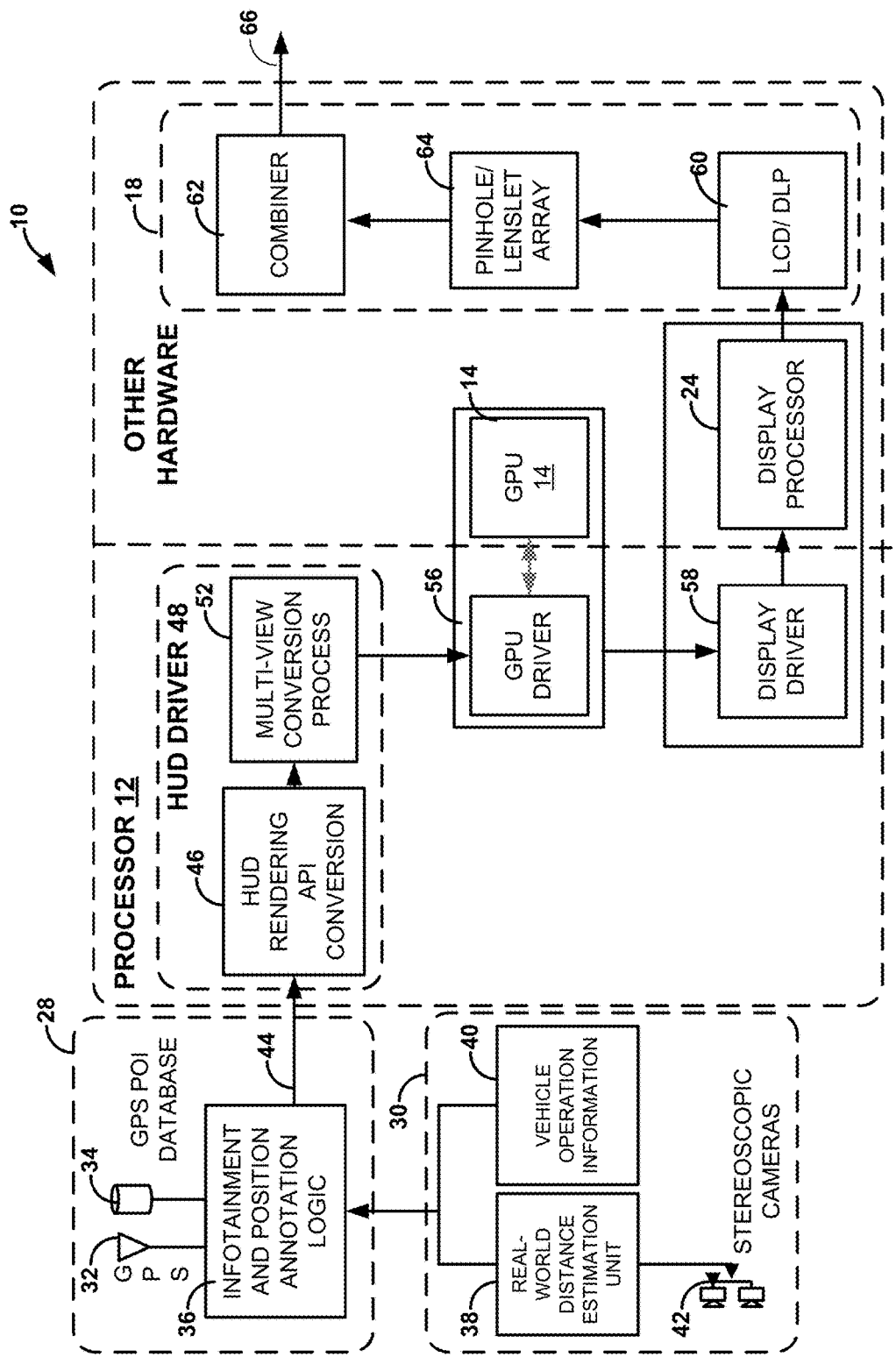
FIG. 6 is a block diagram showing an example of the system of FIG. 1 in more detail.

FIG. 6 is a block diagram showing an example of system 10 of FIG. 1 in more detail. In the example of FIG. 6, distance estimation unit 30 may include a real-world distance estimation unit 38, vehicle operational information unit 40 and stereoscopic cameras 42. Real-world distance estimation unit 38 may be implemented in software executing on a processor (e.g., processor 12), may be implemented as dedicated hardware (e.g., an ASIC), or a combination of both hardware and software.

Stereoscopic cameras 42 may be configured to take a photograph of the field of view of a user of system 10. Stereoscopic cameras 42 include two or more cameras, each at different camera angles such that depth information may be determined from the resultant images. For example, real-world distance estimation unit 38 may be configured to determine the distance to real-world objects photographed by stereoscopic cameras 42 using stereo triangulation techniques. Real-world distance estimation unit 38 may be configured to find corresponding points in the different images generated by stereoscopic cameras 42 and to determine the depth of real-world objects (other vehicles, road signs, obstructions, pedestrians, etc.) given the relative locations of the corresponding points in view of the different camera angles. However, any range imaging other techniques for determining the distance to real-world objects may be used with system 10. Real-world distance estimation unit 38 may be configured to continually determine and update the distance between system 10 (or a vehicle system 10 is installed in) and one or more real-world objects.

Distance estimation unit 30 may further include vehicle operation information unit 40. Vehicle operation information unit 40 may be configured to access information concerning the current operation of a vehicle in which system 10 is used. Such information may include the speed of the vehicle, acceleration of the vehicle, deceleration of the vehicle, or any other information about the current operation of the vehicle that may be used to update the distance between the vehicle and other real-world objects. The vehicle information may be used in conjunction with the distance determination from images produced by stereoscopic cameras 42 to aid in updating distance information. Other vehicle information that may be used to update distance information may include object avoidance information (e.g., an indication from a collision avoidance system that indicates a collision is imminent), information indicating a lane departure (e.g., from a lane departure warning system), and/or information indicating that a lane change assist system has been activated (e.g., in the example where a lane departure warning system indicates the vehicle is leaving its lane).

Real-world distance estimation unit 38 may also be configured to use computer vision and/or image recognition techniques to identify the type of real-world object to which distance is being calculated. For example, distance estimation unit 38 may use image recognition techniques to identify that the real-world object is another car, a road sign, an obstruction, or the like. Distance estimation unit 30 may then provide both the distance to a real-world object together with an identification of the type of real-world object to infotainment and position annotation logic 36. In this way, infotainment and position annotation logic 36 may select an appropriate annotation to display for the identified real-world object.

In the example of FIG. 6, position detection unit 26 may include GPS receiver 32, GPS POI database 34, and the aforementioned infotainment and position annotation logic 36. GPS receiver 32 is a receiver configured to receive satellite signals from GPS satellites in order to determine the current location of system 10. However, it should be noted that any techniques for determining the position and/or location of system 10 may be used, and this disclosure is not limited to GPS. GPS POI database is a database of the locations of fixed POI. By determining the current location of system 10 as well as the location of POI in the vicinity of system 10, infotainment and position annotation logic 36 may determine the distance between system 10 and POI. In some examples, infotainment and position annotation logic 36 may be implemented as software executing on a processor (e.g., processor 12). In other examples, infotainment and position annotation logic 36 may be implemented as dedicated hardware (e.g., an ASIC), or a combination of hardware and software.

Infotainment and position annotation logic 36 may determine which and how many annotations to display. The annotations to be displayed may be predetermined or may be selected by a user. For example, using user interface 20 of FIG. 1, a user may select what vehicle information (routing, speed, mileage, etc.) to be displayed. In addition, a user may indicate a particular POI or POIs (e.g., specific businesses, types of businesses, road intersections, parks, etc.) for which annotations are to be displayed.

In order to render the annotations to be displayed, infotainment and position annotation logic 36 may be configured to indicate the type of annotations to be displayed, the focal distances to render the annotations, and the location in the field of view of the display in which to render the annotations. Infotainment and position annotation logic 36 may provide graphics API commands 44 (e.g., in an OpenGL or DirectX format) to processor 12. API commands 44 may also include information defining a multiview viewport for a plurality of virtual camera angles (i.e., a plurality of views) defining the field of view displayable by display 18 and information defining MVP matrices for each of the plurality of camera angles. Techniques regarding the API commands, multiview viewport, and the MVP information will be discussed in general below, and in more detail with reference to FIGS. 7-9.

Processor 12, executing HUD driver 48 may convert API commands 44 in a manner such that annotations may be rendered for each of a plurality of views in a single pass. First, by executing HUD rendering API conversion 46, processor 12 may convert the multiview viewport information into separate viewport commands for each of the plurality views. Additionally, by executing HUD rendering API 46, processor 12 may generate MVP matrices for each of the plurality of virtual camera angles (i.e., views). In addition, any common commands (i.e., not multiview specific) are passed to multi-view conversion process 52 executed by processor 12.

Processor 12, executing multiview conversion process 52, may rearrange the commands produced by HUD rendering API conversion 46 into a hierarchical buffer arrangement. Multiview conversion process 52 places commands specific to a particular view into a first, higher level buffer. Among the commands in the first, higher level buffer are pointers to execute one or more commands in one or more second, lower level buffers. The commands in the second, lower level buffers are common to all views. In this way, GPU 14 may be able to execute the commands for each of the different views without processor 12 needing to resubmit common commands for each view.

Figure 7:
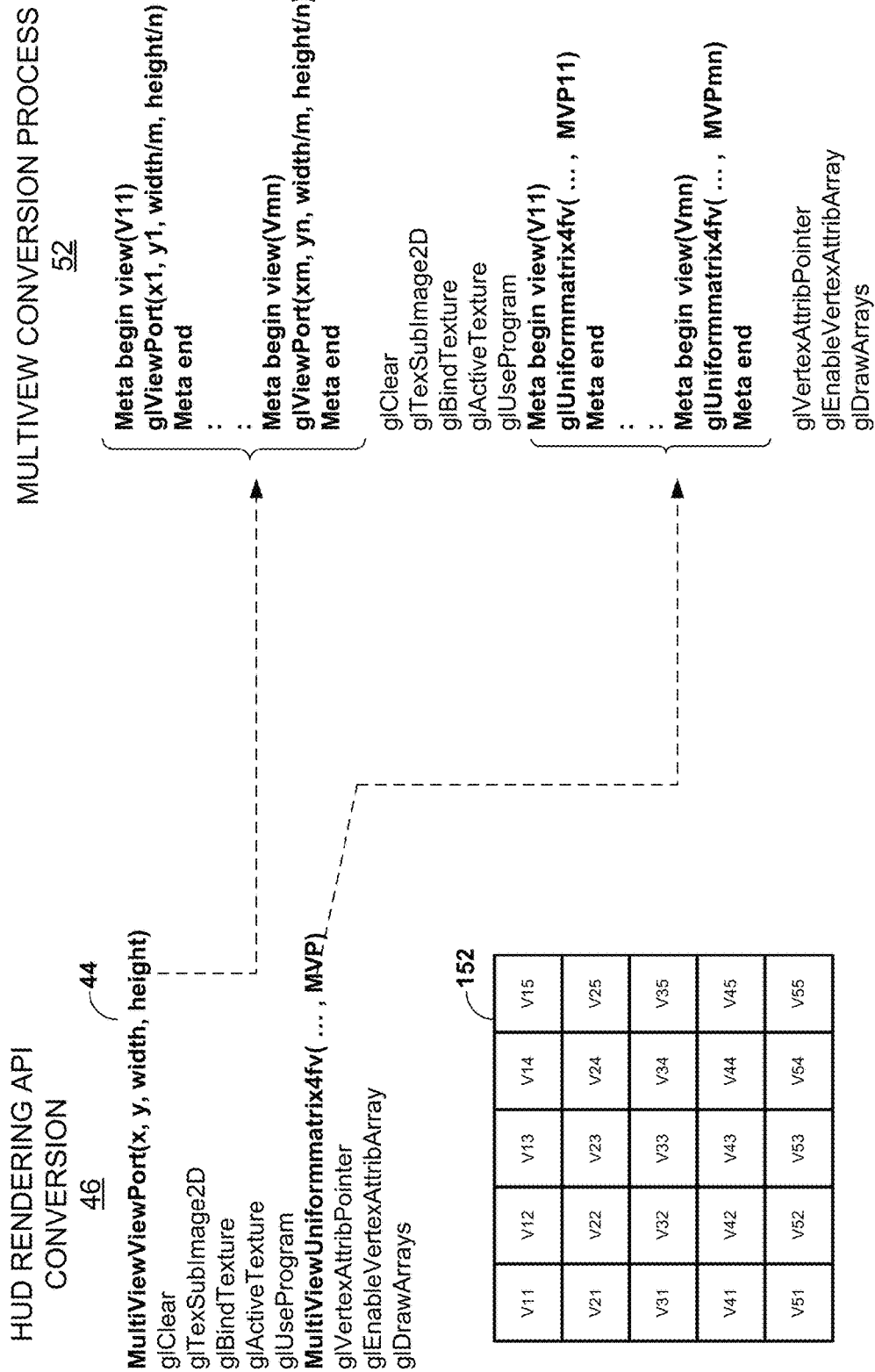
FIG. 7 is a conceptual diagram showing techniques executed by the processor of FIG. 1 in more detail.

FIG. 7 shows API commands 44 received by HUD rendering API conversion 46 executing on processor 12 in more detail. The command MultiViewPort(x, y, width, height) defines the position (i.e., the x, y position) of the origin of the total screen size to be rendered, as well as the width and height of the total screen. The example of FIG. 7 depicts OpenGL commands, though it should be understood that any graphics API may be used. As shown in FIG. 7, HUD rendering API conversion 46 is configured to convert the MultiViewPort command into metadata for each of a plurality of views to be rendered (i.e., view (V11) through view (Vmn)). In the example of FIG. 7, 25 different views are to be rendered into multiview tile 152. Each view is designated by Vmn, where m is the row of the view in multiview tile 152, and n is the column of the view in multiview tile 152. Each view represents the entire rendered scene from a particular virtual camera angle, where each view has a different camera angle. When combined and displayed by a light field projection display (e.g., display 18), the displayed image may include annotations at multiple different focal lengths (i.e., the image is stereoscopic with perceived depth).

HUD rendering API conversion 46 converts the command MultiViewPort(x, y, width, height) into metadata indicating a plurality of glViewPort commands for each of the specific views of multiview tile 152. HUD rendering API 46 adds a Meta begin view (Vmn) command marking the beginning for each glViewPort command for each view. HUD rendering API 46 also adds a Meta end command marking the end of each glViewPort command for each view. The glViewPort commands indicate the location of each view in multiview tile 152.

Figure 8:
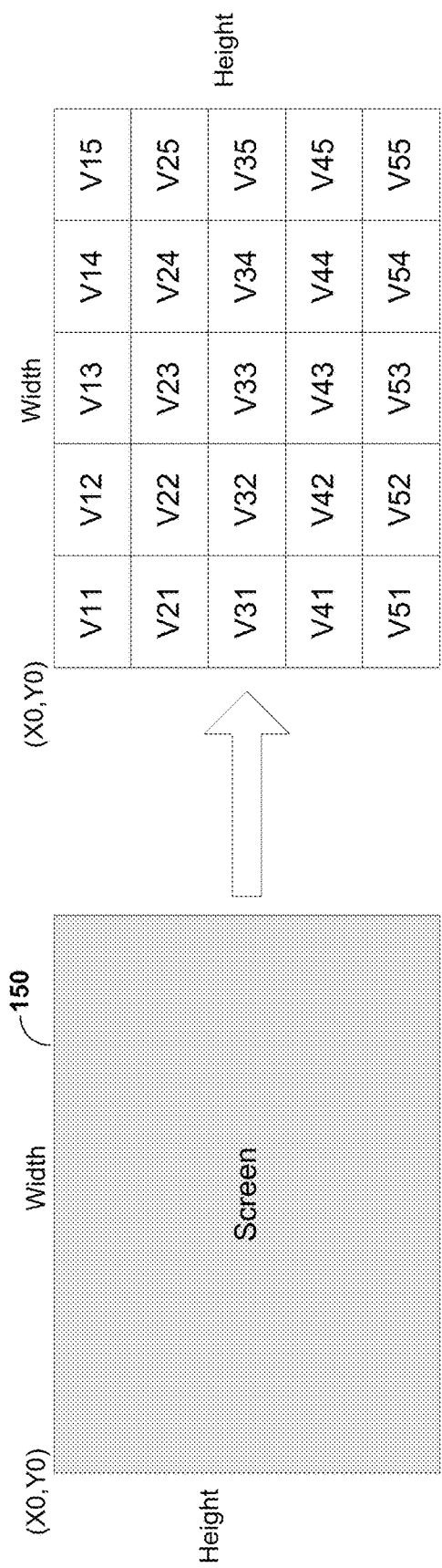
FIG. 8 is a conceptual diagram illustrating how an original MultiViewPort command may be converted into multiple viewport commands for each of a plurality of views.

FIG. 8 is a conceptual drawing illustrating how an original MultiViewPort command may be converted into multiple viewport commands for each of a plurality of views. In this example, there are 25 views Vmn (i.e., V11-V55), where m represents the row of the view and n represents the column of the view. As discussed above, the original MultiViewPort represents the entire screen 150 to be displayed. Screen 150 is defined by an origin (X0, Y0) as well as a width and a height. Each view's width (vw) is defined by the width of the entire screen 150 divided by the total number of columns (m). That is, vw=Width/m. Each views height (vh) is defined by the height of the entire screen 150 divided by the number of rows (n). That is, vh=height/n.

HUD rendering API conversion 46 may determine the origin of each viewport Vmn using the following equation: Vmn Viewport Origin=(X0+(m−1)*vw, Y0+(n−1)*vh). Each individual viewport Vmn would then be defined as (X0+(m−1)*vw, Y0+(n−1)*vh, vw, vh). For example, assuming that X0=0 and Y)=0, the origin for view V11 would be (0+(1−1)*vw, 0+(1−1)*vh)=(0, 0). The origin for view V12 would be (0+(2−1)*vw, 0+(1−1)*vh)=(vw, 0). The origin for view V55 would be (0+(5−1)*vw, 0+(5−1)*vh)=(4vw, 4vh).

Returning to FIG. 7, any common commands (i.e., non-view specific commands) may be stored below the viewport metadata. Example common commands may include glClear, glTexSubImage2D, glBindTexture, glActiveTexture, glUseprogram. The preceding commands are rendering commands in the openGL API. Any rendering commands, and not just those listed, that are not specific to a certain view may be considered a common command. Such common commands may be any commands used to render a view that are the same for every view.

HUD rendering API conversion 46 may also convert multiview uniform matrix information (MultiviewUniformmatrix4fv( . . . , MVP) for the entire screen into MVP matrices for each of the plurality of views. Like the view port information, HUD rendering API 46 may designate the beginning and end of the MVP matrix information for each view with a Meta begin view (Vmn) command and a Meta end command, respectively. Again, any common commands (i.e., non-view specific commands) may be stored below the MVP metadata. Example common commands may include glVertexAttribPointer, glEnableVertextAttribArray, and glDrawArrays. Such common commands may be any commands used to render a view that are the same for every view.

The MVP matrices for each view may be defined by the command glUniformmatrix4fv ( . . . , MVPmn), where each view has its own MVP matrices. The MVP matrices are three matrices that include a model, view, and projection matrix. The view and projection matrices change based on the camera angle of each view. The model matrix maps an object's (e.g., the annotations) local coordinate space into world space. The model matrix also defines the scale and rotation of the annotation. The view matrix maps the view from world space to camera space. The projection matrix projects the camera space to screen space for display. How the MVP matrices are determined for each view will be discussed below.

Each view is based on a different camera location in world space. In the example where display 18 is a projection display, the number of views may be defined by the number of pinholes or lenslets used to project the display. In one example of the disclosure, 25 different views are generated. Fewer views would speed processing at the expense of 3D fidelity. More views would increase 3D fidelity at the expense of processing speed.

The combined MVP matrix for a centered camera location is defined as MVP=P*V*M. That is, the projection matrix, view matrix, and model matrix are multiplied together. The model matrix M is the same for each view: $M=V^{-1} \times P^{-1} \times MVP$. $V^{-1}$ and $P^{-1}$ is an inverted view matrix and inverted projection matrix, respectively. However, the view matrix and projection matrix are different based on the camera position and frustum for each view. The camera position and frustum may be predefined and stored in a configuration file in memory that is accessible by processor 12. Therefore, the MVP of any particular view (labeled MVP') may be defined as MVP'=P'*V'*M. Again, the model matrix M is the same for all views.

Figure 9:
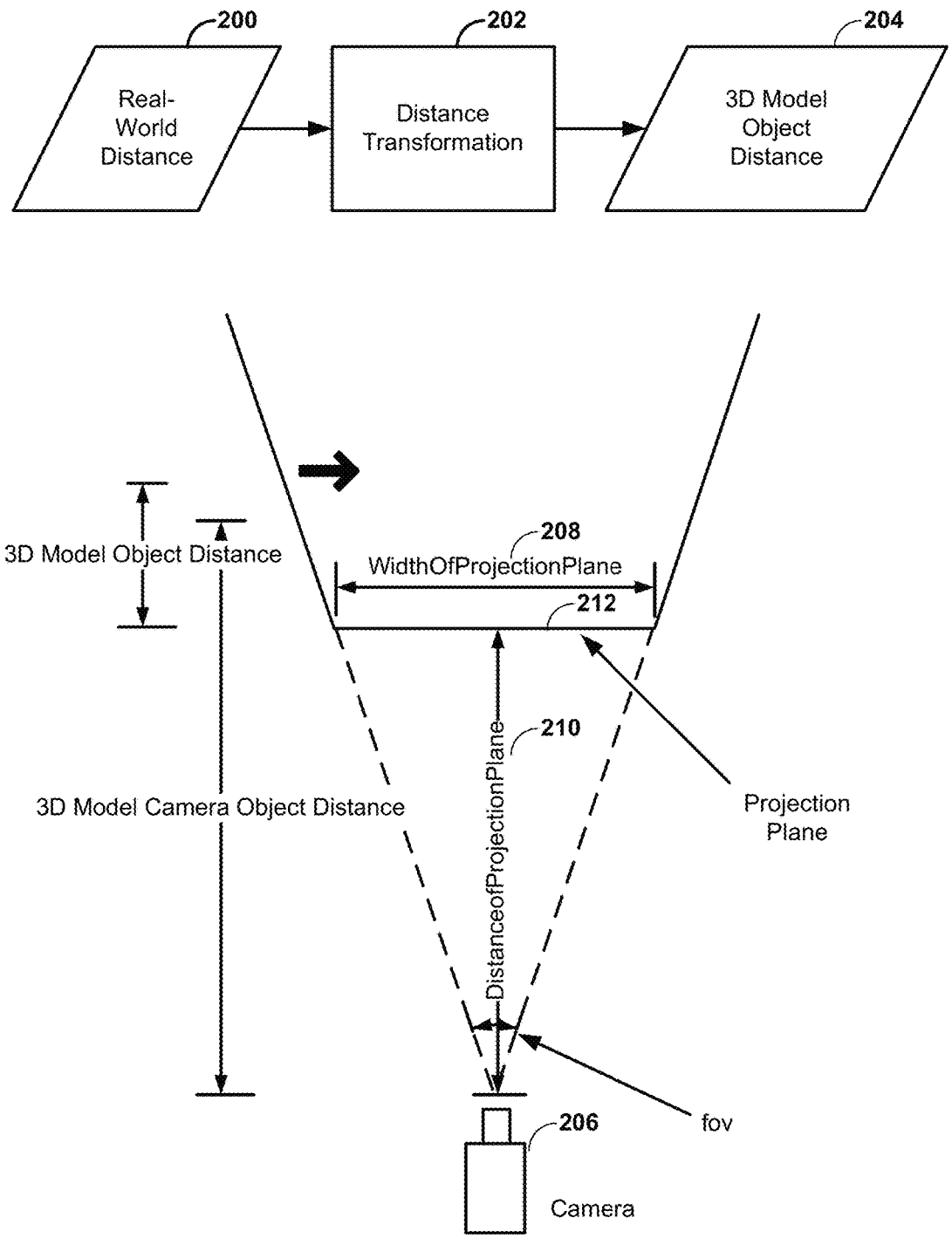
FIG. 9 is a conceptual diagram showing techniques for determining the distance of a 3D object from a virtual camera.

As shown in FIG. 9, the real-world distance 200, e.g., determined by distance estimation unit 30 may be converted to a 3D model object distance 204 by processor 12 using distance transformation process 202. In other words, distance transformation process 202 converts a real-world distance into a distance in 3D model space. Distance transformation process 202 is achieved by multiplying the real-world distance 200 by a ratio 3D world space to real world space (called RatioOf3DWorldByRealWorld). RatioOf3DWorldByRealWorld is defined as follows:

$$RatioOf3DWorldByRealWorld = \frac{WidthOfProjectionPlane}{PhysicalDimensionOfDisplayWidth}$$

$$= \frac{2 \times \left(DistanceOfProjectionPlane \times \tan\left(\frac{fov}{2}\right)\right)}{PhysicalDimensionOfDisplayWidth}$$

WidthOfProjectionPlane 208 is a variable that defines the width of the light field that may be gathered by virtual camera 206 given the distance (DistanceOfProjectionPlane 210) virtual camera 206 is from projection plane 212. Projection plane 212 is the plane at which objects in the 3D world (e.g., the annotations, labeled 3D Model Object in FIG. 9) are projected. In the examples of this disclosure, the projection plane 212 may be the lenslet array or the pinhole mask. The variable PhysicalDimensionOfDisplayWidth is the width of the actual physical display. The variable fov is the field of vision (e.g., defined by an angle) that is visible by camera 206 given the WidthOfProjectionPlane 208 and the DistanceOfProjectionPlane 210. tan represents a tangent operation.

Figure 10:
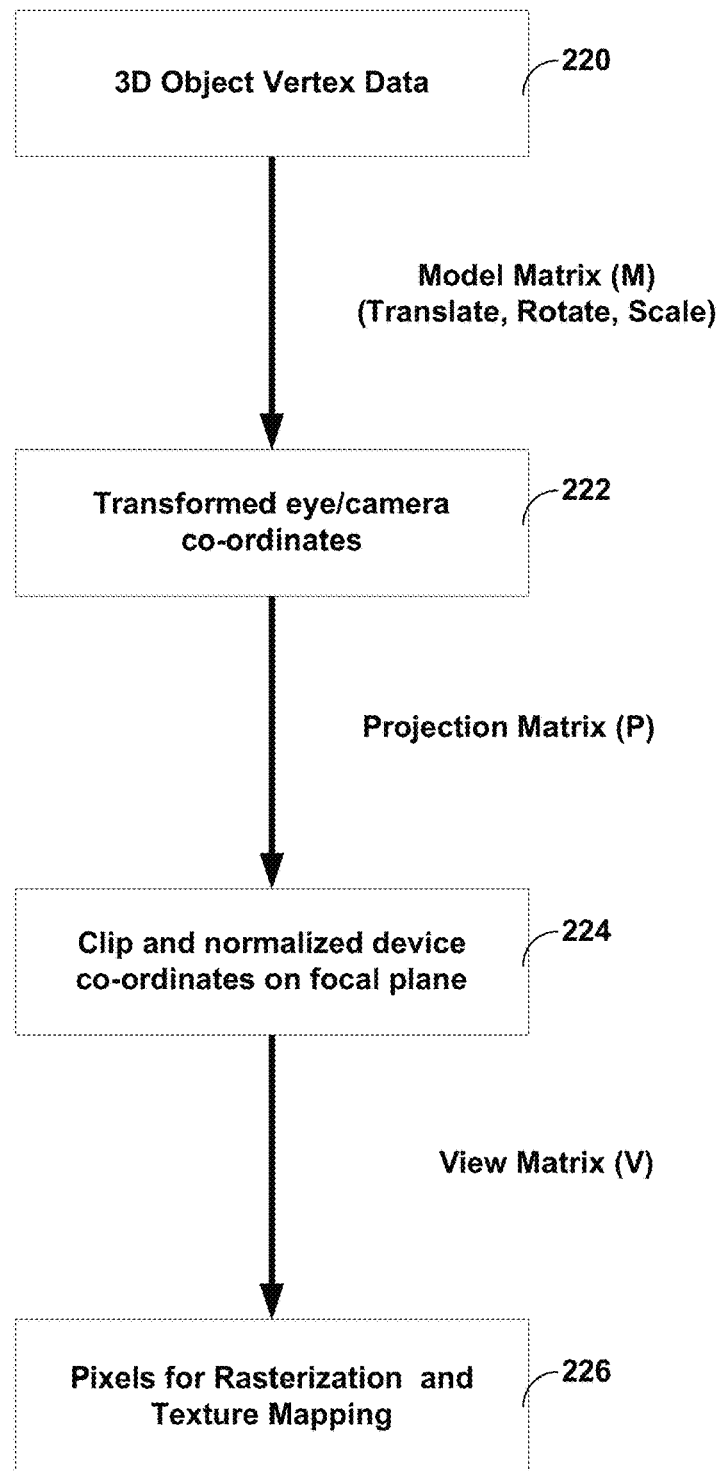
FIG. 10 is a flow diagram showing techniques for applying model, view, and projection matrices to 3D objects.

FIG. 10 is a flow diagram showing how the MVP matrices are applied to the annotation for a particular camera view (i.e., the 3D object) in order to render the annotation, for example, by GPU 14. First, 3D object (e.g., the annotations) vertex data is obtained by GPU 14 (220). The geometry of each of the annotations may be predefined and stored in a memory (e.g., system memory 16). The position of the 3D object in world space may be determined using the techniques discussed above with respect to FIG. 9. GPU 14 may then apply model matrix M to 3D object vertex data 220 to produce transformed eye/camera coordinates (222). For example, matrix model M may translate the annotation to position (X, Y, distance_of_object), where X and Y are the coordinates in 3D world space defined for the particular camera view, and distance_of_object is the Z distance of the annotation in 3D world space relative to the virtual camera, e.g., as determined using the techniques described above with reference to FIG. 9. As mentioned above, the model matrix is the same for each camera view. The model matrix may be predefined and determines how the annotations are translated, rotated, and scaled.

Next, GPU 14 applies the projection matrix (P) to the transformed eye/camera coordinates to produce clipped and normalized device co-ordinates on the focal (projection) plane (224). The projection matrix (P) is different for each of the camera views. How the projection matrix is determined will be discussed in more detail below. GPU 14 then applies the view matrix (V) to the clipped and normalized device coordinates to produce pixels that may be rasterized and texture mapped (226). The view matrix (V) is also different for each of the camera views. How the view matrix is determined will also be discussed in more detail below.

An example of view matrix (V) is shown in FIG. 11. The Right coordinates right_x, right_y, and right_z are the coordinates of a right vector (X direction) from the camera. The Up coordinates Up_x, Up_y, and Up_z are the coordinates of an Up vector (Y direction) from the camera. The Look coordinates Look_x, Look_y, and Look_z are the coordinates of a Look vector (Z direction) from the camera. The Position coordinates—(Right*Position), —(Up*Position), and —(Look*Position) represent the translation of the space given the position of the particular virtual camera in the space. As such, it can be seen that the view matrix can be changed for each camera view given the relative position of the cameras. Again, the number of camera views and relative positions of the cameras may be predefined and stored in a configuration file in system memory 16.

An example of view matrix (V) is shown in FIG. 12. The definition of the terms Near, Far, right, left, top, and bottom will be defined relative to FIG. 13. The frustum of camera 206 is the region of 3D world space that appear on the screen given the position and field of vision of a particular virtual camera. The frustum is defined with 3D shape relative to near plane 234, focal (projection) plane 212, and far plane 232. As discussed above projection plane 212 is the plane at which objects in the 3D world (e.g., the annotations) are projected. Far plane 232 and near plane 234 may be predetermined and stored in a configuration file in system memory 16. Far plane 232 represents the farthest point away from camera 206 at which objects in 3D world space may be rendered. Near plane 234 represents the closest point from camera 206 at which objects in 3D world space may be rendered. The frustum is the pyramidal shape defined by far plane 232, projection plane 212, and near plane 234. Any objects outside the frustum will not be rendered.

Referring to the projection matrix (P) in FIG. 12, far is simply far plane 232 and near is near plane 234. Left is the plane defined by the left edge of near plane 234 extending to the left edge of far plane 232. Top is the plane defined by the top edge of near plane 234 extending to the top edge of far plane 232. Right is the plane defined by the right edge of near plane 234 extending to the right edge of far plane 232. Bottom is the plane defined by the bottom edge of near plane 234 extending to the bottom edge of far plane 232.

Figure 13:
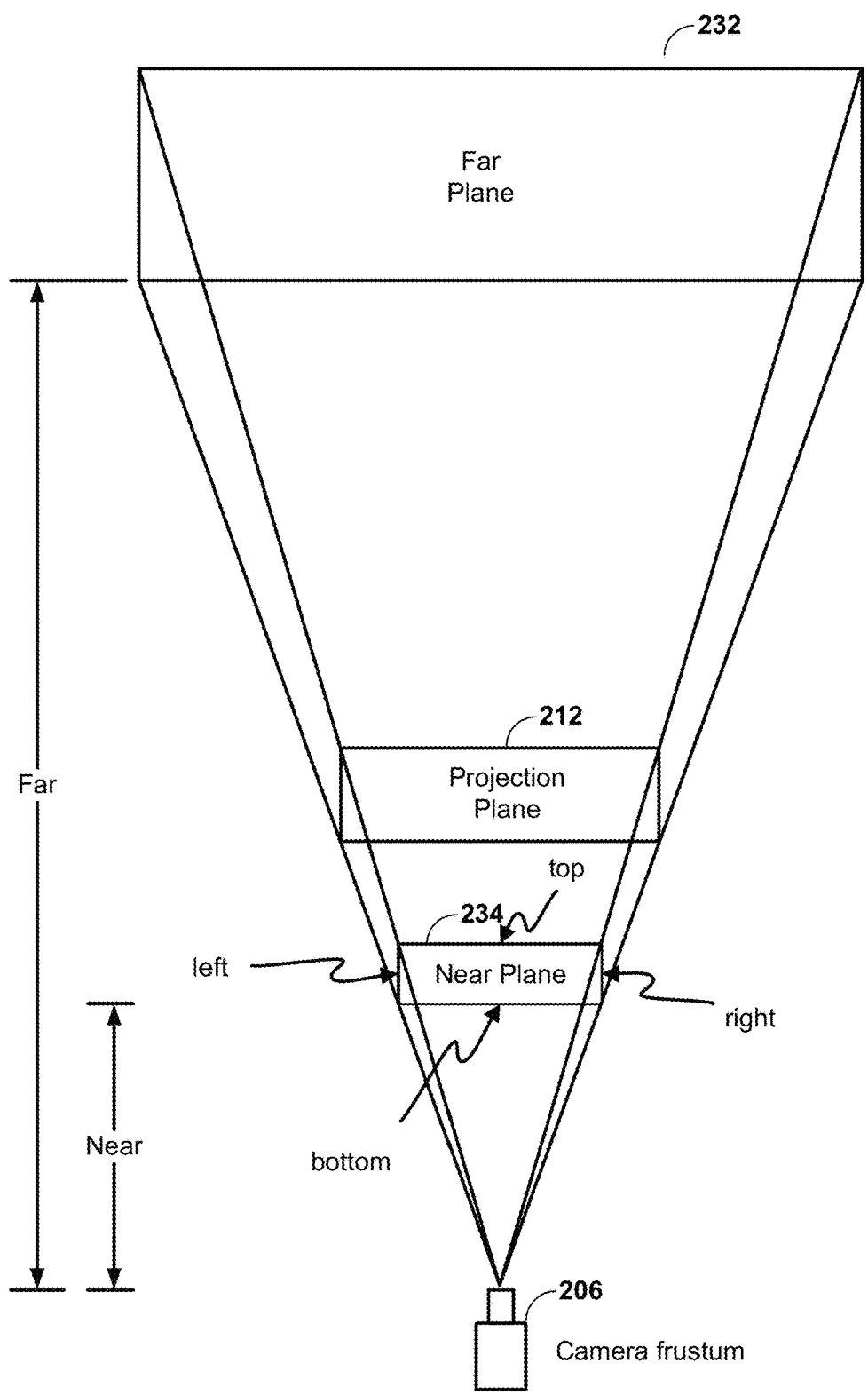
FIG. 13 is a conceptual diagram showing example planes defining a projection matrix.

The examples of FIG. 12 and FIG. 13 are for a centered camera frustum. However, other than the center camera, all other virtual camera views will be offset by a predetermined camera separation distance (e.g., Camera_separation_distanceX and Camera_separation_distance). That is, each virtual camera will be in a different position in 3D world space in both an X direction and a Y direction. The projection matrix P for the centered camera frustum may be stored in a configuration file stored in system memory 16. The updated values of the left plane (left'), right plane (right'), top plane (top'), and bottom plane (bottom') for the other cameras may be calculated based on the predetermined camera separation distance (e.g., Camera_separation_distanceX and Camera_separation_distance) as shown below:

$$\text{left}' = \text{left} - \frac{\text{Near} * \text{Camera\_separation\_distanceX}}{\text{Distance\_of\_Projection\_Plane}}$$

$$\text{right}' = \text{right} - \frac{\text{Near} * \text{Camera\_separation\_distanceX}}{\text{Distance\_of\_Projection\_Plane}}$$

$$\text{top}' = \text{top} - \frac{\text{Near} * \text{Camera\_separation\_distanceY}}{\text{Distance\_of\_Projection\_Plane}}$$

$$\text{bottom}' = \text{top} - \frac{\text{Near} * \text{Camera\_separation\_distanceY}}{\text{Distance\_of\_Projection\_Plane}}$$

As such, each different camera view will have a different projection matrix.

Figure 14:
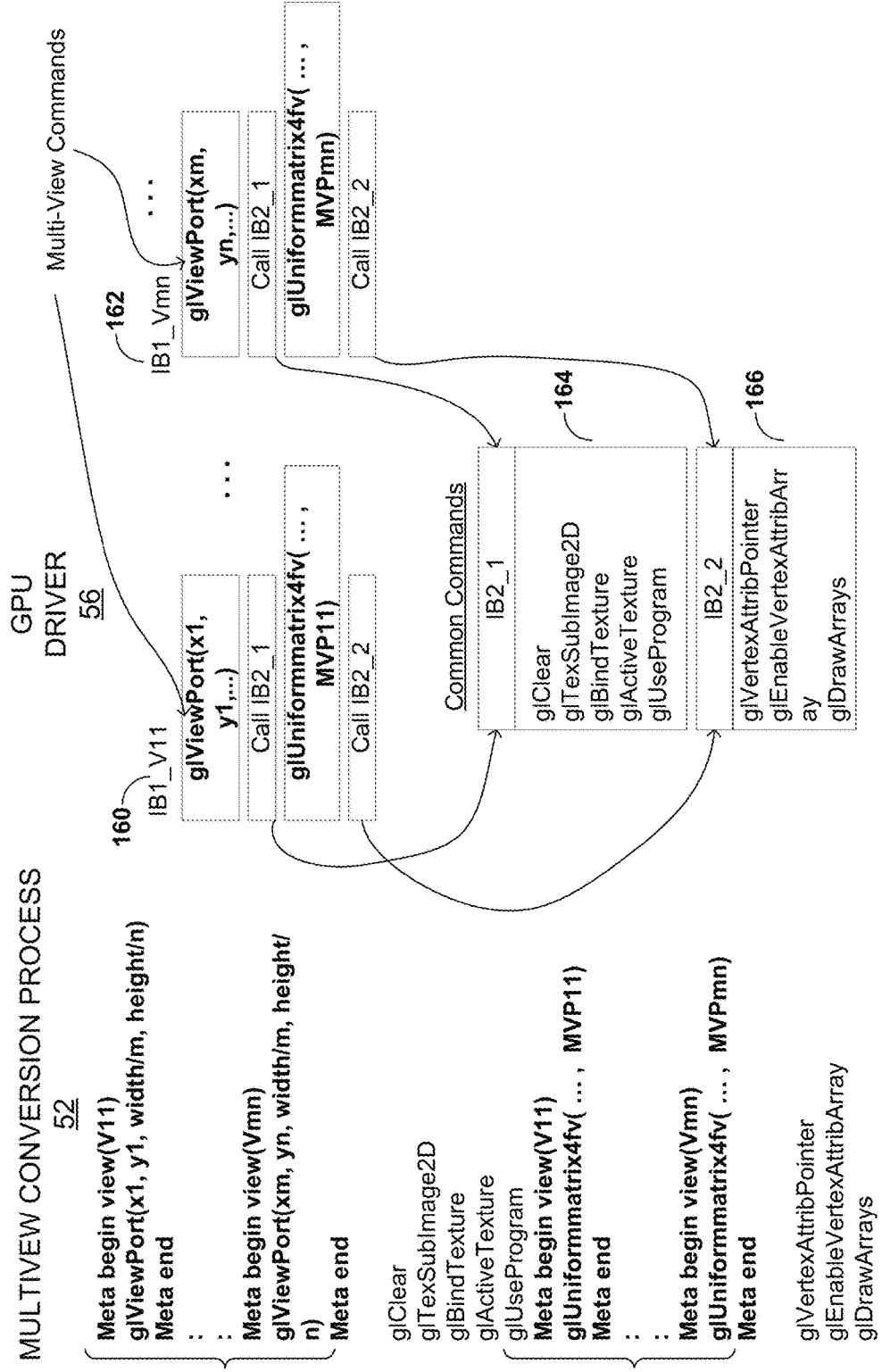
FIG. 14 is a conceptual diagram showing techniques executed by the processor of FIG. 1 in more detail.

FIG. 14 shows multiview conversion process 52 executed by processor 12 in more detail. As shown in FIG. 14, multiview conversion process 52 receives the commands generated by HUD rendering API conversion 46. That is, each of the viewports for all of the separate views as well as each of the MVP matrices of all of the several views, together with the common commands for each view, are provided to multiview conversion process 52 of HUD driver 48. Multiview conversion process 52 rearranges the commands received from HUD rendering API conversion 46 and stores the commands in a hierarchical buffer structure and sends the commands to GPU driver 56 for further processing.

In one example, multiview conversion process may store each of the viewport commands (e.g., glViewPort) and MVP commands (e.g., glUniformmatrix4fv) for each view in a first level buffer. For example, as shown in FIG. 14, the viewport and MVP commands for V11 are stored in a first level indirect buffer 160 (IB1_V11). In one example, multiview conversion process 52 may store the viewport and MVP commands in a separate first level indirect buffer for every view. A generalized first level indirect buffer 162 (IB1_Vmn) is shown for a generalized view Vmn. In other examples, the viewport and MVP commands for each view may be concatenated in a single first level indirect buffer.

In accordance with one example technique of this disclosure, multiview conversion process 52 only places view-specific commands (the multi-view commands) into first level indirect buffers (e.g., buffers 160 and 162). Multiview conversion process 52 stores commands that are not view-specific (e.g., the common commands), in one or more second level buffers. For example, the common commands related to setting up a viewport may be stored in second level indirect buffer 164 (IB2_1) and the common commands related to rendering using the MVP matrices may be stored in second level indirect buffer 166 (IB2_2).

In order to execute the commands in second level indirect buffer 164, multiview conversion process includes an instruction in first level indirect buffer 160 to call the commands in second level indirect buffer 164 (Call IB2_1). Likewise, in order to execute the commands in second level indirect buffer 166, multiview conversion process includes an instruction in first level indirect buffer 160 to call the commands in second level indirect buffer 166 (Call IB2_2). In this way, commands that are common to all views need only be supplied to GPU driver 56 once in one set of second level indirect buffers.

Through execution of both HUD rendering API conversion 46 and multi-view conversion process 52, processor 12 is able to generate a single set of commands such that GPU 14 may render the annotations provided by infotainment and position annotation logic 36 in one pass. Previous techniques would have required a separate command stream for each view, and thus, in the example of FIG. 7, 25 separate rendering passes given the 25 views of multiview tile 152.

Returning to FIG. 6, after executing multiview conversion process 52 and generating the hierarchical command structure, processor 12 may execute GPU driver 56 to generate any other commands needed for execution on the particular GPU 14 being used. GPU 14 is then configured to execute the commands produced by processor 12 and render the annotations in each of the plurality of views. The frame rendered by GPU 14 may then be stored in a memory (e.g., system memory 16 of FIG. 1) in the format of multiview tile 152 (see FIG. 7).

Processor 12, through execution of display driver 58, may instruct display processor 24 to cause the frame rendered by GPU 14 to be displayed by display 18. The frame rendered by GPU may be stored in a multiview tile format, where each tile of the frame is one of the rendered views. However, a different format of data may be needed to display such a scene using a light field display. Display processor 24 is configured to rearrange the multiview tile format produced by GPU 14 into a format compatible with display 18.

Figure 15:
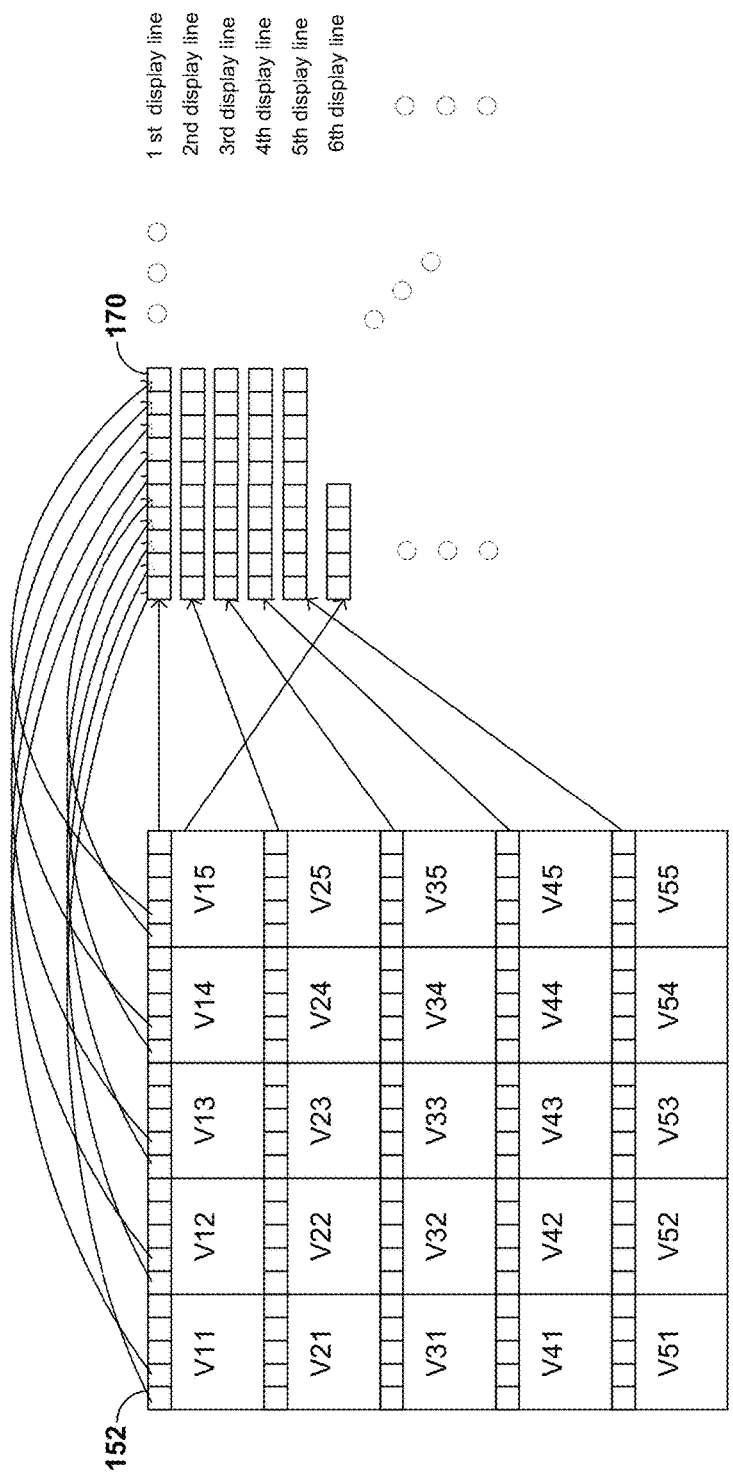
FIG. 15 is a conceptual diagram showing an example multiview tile to light field tile conversion.

FIG. 15 is a conceptual diagram showing an example conversion process from multiview tile 152 to light field tile 170. Again, as stated above, each view in multiview tile 152 represents the entire frame to be rendered from a particular virtual camera angle. As such, though they are not collated in multiview tile 152, corresponding pixels in each of views Vmn are spatially collated in the rendered scene. For example, the pixel in the upper left corner of V11 represents the same area of the scene as the upper left corner in view V53, and view V35, and so on, but at different camera angles. As such, display processor 24 may be configured to rearrange the pixels in multiview tile 152 so that all corresponding pixels are grouped in order to create light field tile 170.

As one example, the first display line of light field tile 170 would include all of the pixels from the first line of all views in the first row of views of multiview tile 152 (i.e., views V11, V12, V13, V14, V15). However, as stated above, display processor 24 rearranges the pixels such that the pixel in the upper left corner of view V11 is first, followed by the pixel in the upper left corner of V12, followed by the pixel in the upper left corner of V13, and so on. Once, the pixel in the upper left corner of view V15 is reached, the next pixel in the first display line of light field tile 170 is the second pixel in the upper line of view V11.

In light field tile 170, the second display line does not come from the second row of pixels in the views of the first row of multiview tile 152, but rather comes from the first row of pixels in the views of the second row of multiview tile 152 (i.e., views V21, V22, V23, V24, V25). This process is repeated for the entirety of multiview tile 152.

Figure 16:
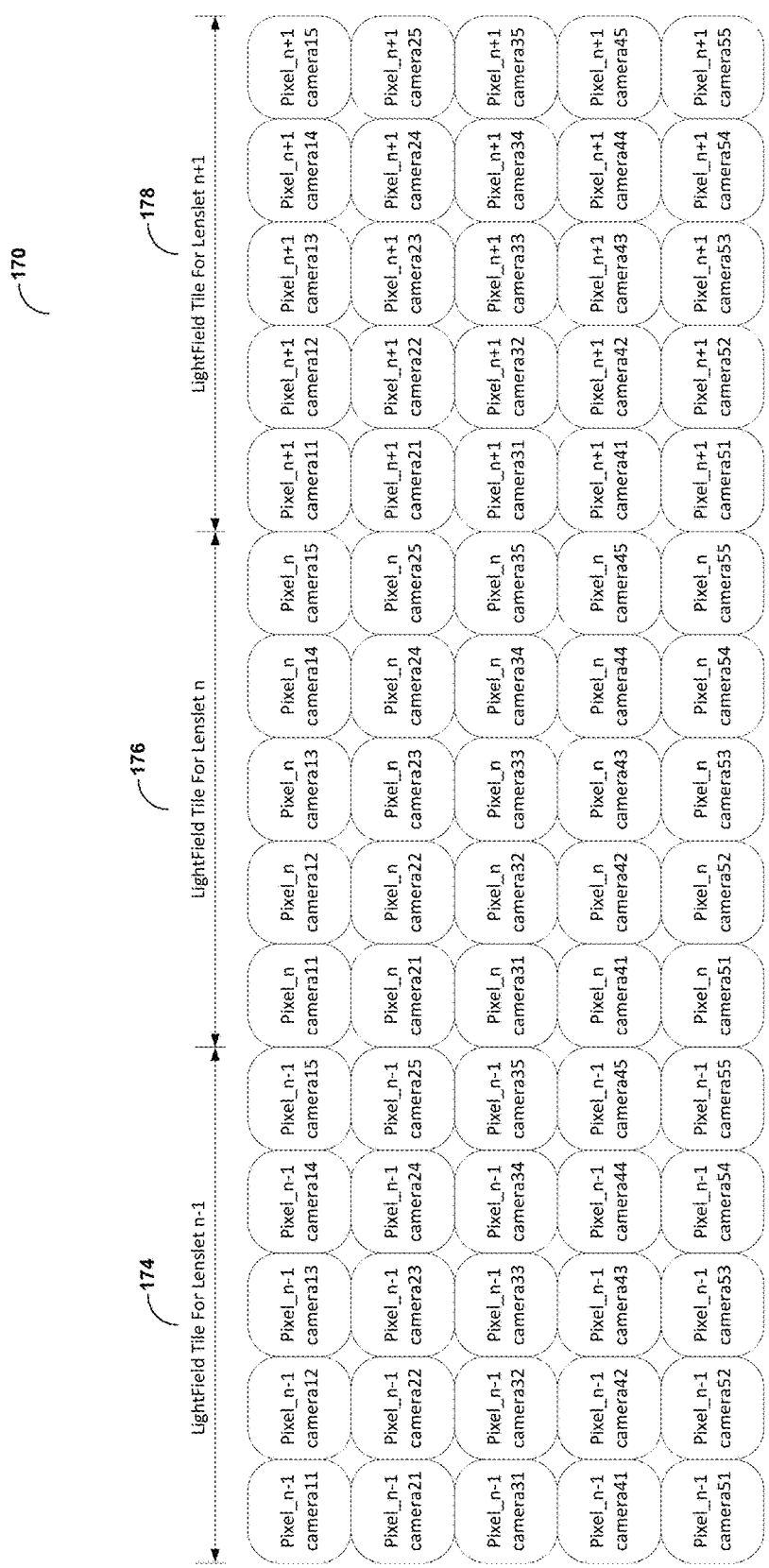
FIG. 16 is a conceptual diagram showing an example light field tile in more detail.

FIG. 16 shows an example light field tile 170 in more detail. The example of FIG. 16 shows the light field tile arrangement in the case that display 18 uses a lenslet array. As will be explained below, a different arrangement may be used for different types of displays, including displays that use a pinhole mask. The example of FIG. 16 shows three pixels worth of data for projecting through three different lenslet arrays. Light field sub-tile 174 (pixel n−1) is projected through lenslet n−1, light field tile sub-tile 176 (pixel n) is projected through lenslet n, and light field sub-tile 178 (pixel n+1) is projected through lenslet n+1. As can be seen in FIG. 26, each light field sub-tile includes 25 pixel values. These 25 pixel values are obtained from the 25 different views of multiview tile. The designations pixel_n−1, pixel_n, and pixel_n+1 indicate the location of the pixel within a particular view, while camera 11 indicates the particular view (i.e., camera 11 is equal to V11, camera 12 is equal to V12, etc.).

Returning to FIG. 6, after display processor 24 has generated light field tile 170, display processor may be configured to store light field tile 170 in a framebuffer (e.g., in system memory 16 of FIG. 1) and to instruct underlying display 60 to display light field tile 170. In other examples, display processor 24 may send the light field tile 170 directly to display 18 without writing light field tile 170 to system memory 16. In the example of FIG. 6, underlying display 60 may be an LCD or DLP, though other types of underlying displays may be used. In order to direct the light produced by underlying display 60 and produce a three-dimensional field of view, the light produced by underlying display 60 is directed though a pinhole or lenslet array 64.

The scattered light may be directed at combiner 62 in order to collimate the scattered light and project the final displayed image 66 back in the user's field of view. Combiner 62 may be a flat piece of glass or other mechanism (e.g., a beam splitter) that collimates the light and projects the light field back at the user within the user's field of view (e.g., in the windshield of an automobile).

Figure 17:
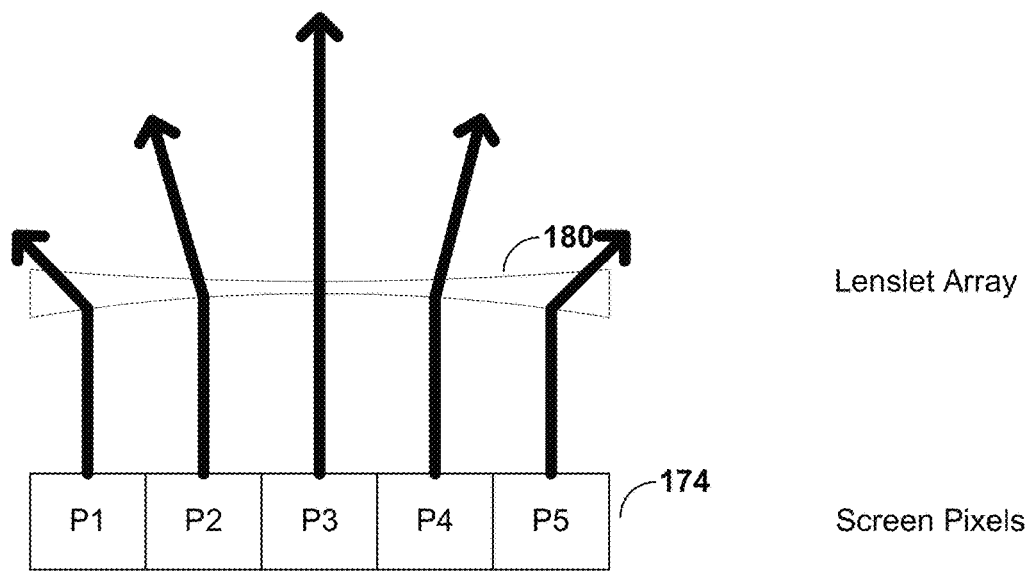
FIG. 17 is a diagram showing example display types.
Figure 17:
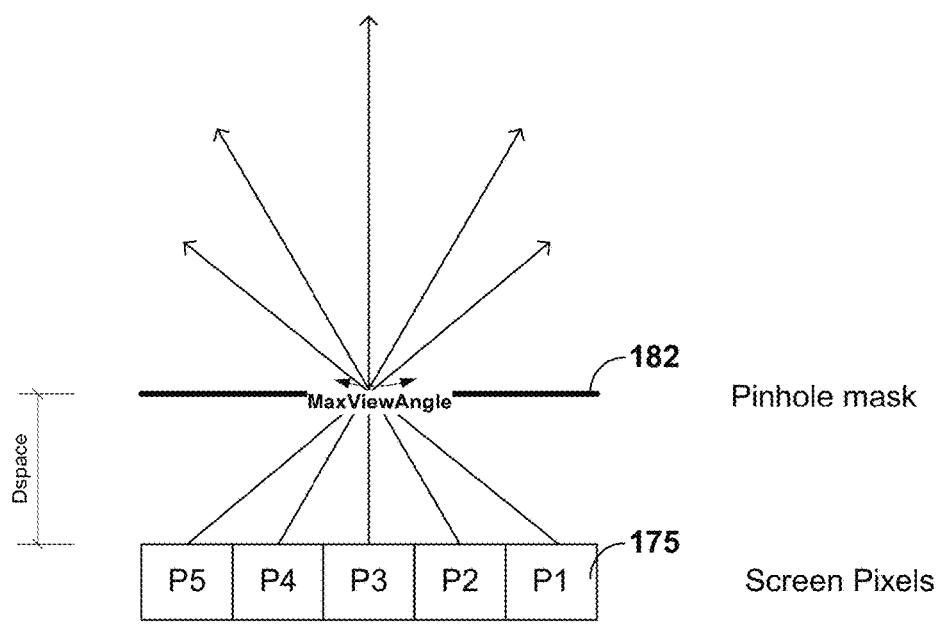

FIG. 17 is a diagram showing example display types. In one example, display 18 may use a lenslet array. The lenslet array may include a plurality of lenslets 180 for each pixel to be displayed. Lenslet 180 is a lens that directs the light produced by underlying display 60 at different angles. As can be seen in FIG. 17, lenslet 180 directs light at angles generally outward based on the refractive focal length of lenslet 180. As such, the arrangement of light field sub-tile 174 may be used by display processor 24.

In another example, display 18 may use a pinhole mask, including one pinhole 182 for each pixel to be displayed. As shown in FIG. 17, the distance between the screen pixels and the pinhole (Dspace) defines the maximum viewing angle (MaxViewAngle) of the scattered light produced by pinhole 180. The larger the Dspace the larger is the viewing angle. Pinhole 182 directs the light produced by underlying display 60 based on the gap (Dspace) and the hole location.

As shown in FIG. 17, light is scattered by pinhole 180 in the opposite manner as lenslet 180. That is, the leftmost screen pixel is not directed to the left, as with lenslet 180, but is directed to the right using pinhole 182. As such, the arrangement of light field sub-tile 174 should not be used with pinhole 182. Instead, the light field tile should be reversed, left to right, as shown by light field sub-tile 175.

Referring back to FIGS. 9-13, the maximum angle produced by pinhole 182 or by lenslet 180 determines the position of the virtual camera in 3D world space given the predetermined distance to the projection plane (distance_of_projection_plane in FIG. 9). The number of pixels behind a particular pinhole in pinhole mask 182 determines the total number of camera views that may be used. In one example of the disclosure, display 18 is configured such that there is a 5×5 matrix of pixels per pinhole. As such, each 5×5 matrix of pixels corresponds to one camera view. Thus, 5×5 multiview tiles are rendered from 5×5 corresponding cameras.

Figure 18:
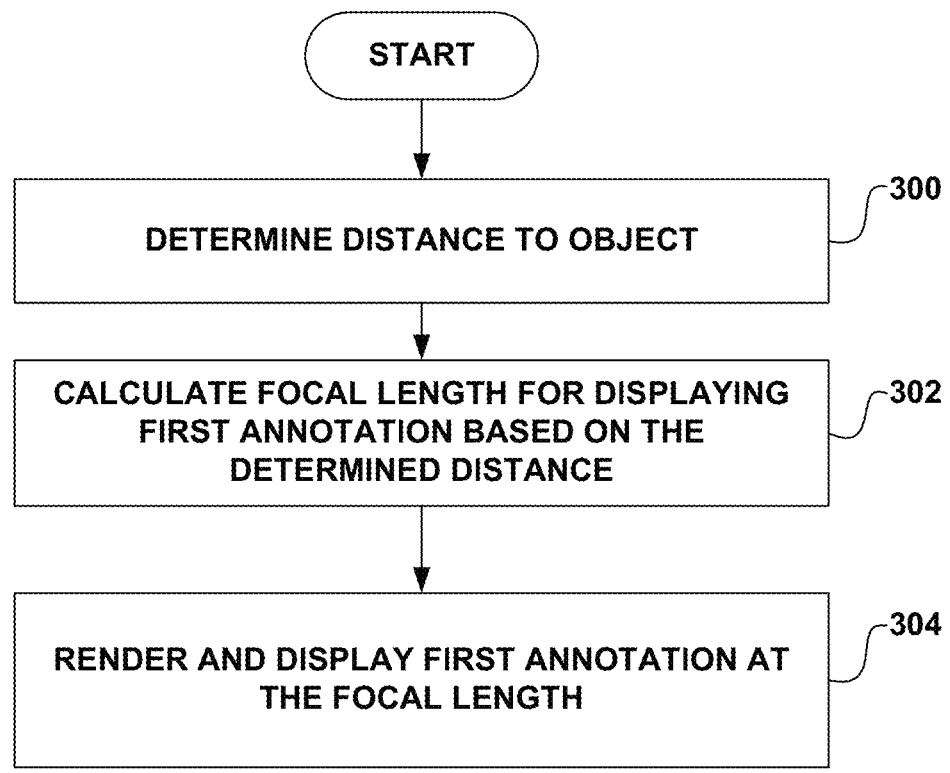
FIG. 18 is a flowchart showing an example method according to the techniques of the disclosure.

FIG. 18 is a flowchart showing an example method of the disclosure. In one example of the disclosure, processor 12 may be configured to determine a distance to an object (300). For example, processor 12 may direct distance estimation unit 30 to determine a distance to a real-world object. Processor 12 may be further configured to calculate a focal length for displaying a first annotation with display 18 based on the distance (302). Processor 12, in conjunction with GPU 14 and display processor 24, may render the first annotation and display the first annotation at the calculated focal length (304). In one example, display 18 is a projection display. In other examples, the projection display is one of a light field projector using a pinhole, mask, a light field projector using a lenslet array, or a retinal projector.

In a further example of the disclosure, processor 12, using distance estimation unit 30, may be configured to determine an updated distance to the object. Processor 12 may further calculate an updated focal length for displaying the first annotation based on the updated distance, and display the first annotation with the display at the updated focal length.

In other examples, processor 12 may be configured to determine respective focal lengths for one or more additional annotations, the one or more additional annotations being different than the first annotation, and display the one or more additional annotations at their respective focal lengths. In one example, determining the distance to the object comprises continuously determining the distance to the object at a series of time intervals, and calculating the focal length comprises continuously calculating the focal length based on the distance at the series of time intervals.

In other examples of the disclosure, GPU 14 may be configured to render the first annotation at a plurality of views. In this example, processor 12 may be configured to receive a multiview viewport for the plurality of views, receive a model view projection for the plurality of views, generate a respective viewport for each respective view of the plurality of views, generate a respective model view projection for each respective view of the plurality of views, store first commands that are specific to each respective view of the plurality of views in a respective first level buffer for each respective view of the plurality of views, and store second commands that are common to each respective view of the plurality of views in a second level buffer, wherein the first commands in the respective first level buffers call the second commands in the second level buffer. GPU 14 may be configured to render the first annotation comprises executing the respective first level buffers for each of the plurality of views.

In another example of the disclosure, the rendered first annotation is stored in a multiview tile format. In this example, display processor 24 may be configured to convert the rendered first annotation from the multiview tile format to a light field tile format.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for information display, the method comprising:
   determining a distance between a display and an object;
   calculating a focal length for displaying a first annotation with the display based on the distance;
   rendering, with a graphics processing unit (GPU), the first annotation at a plurality of views based on the calculated focal length, wherein rendering includes:
     receiving a multiview viewport for the plurality of views,
     receiving a model view projection for the plurality of views,
     generating a respective viewport for each respective view of the plurality of views,
     generating a respective model view projection for each respective view of the plurality of views,
     storing first commands that are specific to each respective view of the plurality of views in a respective first level buffer for each respective view of the plurality of views,
     storing second commands that are common to each respective view of the plurality of views in a second level buffer, wherein the first commands in the respective first level buffers call the second commands in the second level buffer, and
     executing the respective first level buffers for each of the plurality of views; and
   displaying, with the display, the rendered first annotation at the focal length.

2. The method of claim 1, further comprising:
   determining an updated distance to the object;
   calculating an updated focal length for displaying the first annotation based on the updated distance; and
   displaying the first annotation with the display at the updated focal length.

3. The method of claim 2, further comprising:
   determining respective focal lengths for one or more additional annotations, the one or more additional annotations being different than the first annotation; and
   displaying the one or more additional annotations at their respective focal lengths.

4. The method of claim 1, wherein determining the distance to the object comprises continuously determining the distance to the object at a series of time intervals, and
   wherein calculating the focal length comprises continuously calculating the focal length based on the distance at each of the time intervals.

5. The method of claim 1, wherein the display is a projection display.

6. The method of claim 5, wherein the projection display is one of a light field projector using a pinhole, mask, a light field projector using a lenslet array, or a retinal projector.

7. The method of claim 1, wherein the rendered first annotation is stored in a multiview tile format, the method further comprising:
   converting, with a display processor, the rendered first annotation from the multiview tile format to a light field tile format.

8. An apparatus for information display, the apparatus comprising:
   a memory configured to store annotations; and
   one or more processors configured to:
     determine a distance between a display and an object;
     calculate a focal length for displaying a first annotation with the display based on the distance;

render the first annotation at a plurality of views based on the calculated focal length, wherein to render the first annotation the one or more processors are further configured to:
  receive a multiview viewport for the plurality of views,
  receive a model view projection for the plurality of views,
  generate a respective viewport for each respective view of the plurality of views,
  generate a respective model view projection for each respective view of the plurality of views,
  store first commands that are specific to each respective view of the plurality of views in a respective first level buffer for each respective view of the plurality of views,
  store second commands that are common to each respective view of the plurality of views in a second level buffer, wherein the first commands in the respective first level buffers call the second commands in the second level buffer, and
  execute the respective first level buffers for each of the plurality of views; and
display the rendered first annotation at the focal length.

9. The apparatus of claim 8, wherein the one or more processors are further configured to:
determine an updated distance to the object;
calculate an updated focal length for displaying the first annotation based on the updated distance; and
display the first annotation with the display at the updated focal length.

10. The apparatus of claim 9, wherein the one or more processors are further configured to:
determine respective focal lengths for one or more additional annotations, the one or more additional annotations being different than the first annotation; and
display the one or more additional annotations at their respective focal lengths.

11. The apparatus of claim 8, wherein to determine the distance to the object, the one or more processors are configured to continuously determine the distance to the object at a series of time intervals; and
wherein to calculate the focal length, the one or more processors are configured to continuously calculate the focal length based on the distance at the series of time intervals.

12. The apparatus of claim 8, further comprising:
the display.

13. The apparatus of claim 12, wherein the display is a projection display.

14. The apparatus of claim 13, wherein the projection display is one of a light field projector using a pinhole, mask, a light field projector using a lenslet array, or a retinal projector.

15. The apparatus of claim 8, wherein the one or more processors include a central processing unit and a graphics processing unit.

16. The apparatus of claim 8, wherein the rendered first annotation is stored in a multiview tile format, and wherein the apparatus further comprises a display processor configured to:
convert the rendered first annotation from the multiview tile format to a light field tile format.

17. An apparatus information display, the apparatus comprising:
means for determining a distance between a display and an object;
means for calculating a focal length for displaying a first annotation with the display based on the distance;
means for rendering the first annotation at a plurality of views based on the calculated focal length, wherein the means for rendering includes:
  means for receiving a multiview viewport for the plurality of views,
  means for receiving a model view projection for the plurality of views,
  means for generating a respective viewport for each respective view of the plurality of views,
  means for generating a respective model view projection for each respective view of the plurality of views,
  means for storing first commands that are specific to each respective view of the plurality of views in a respective first level buffer for each respective view of the plurality of views,
  means for storing second commands that are common to each respective view of the plurality of views in a second level buffer, wherein the first commands in the respective first level buffers call the second commands in the second level buffer, and
  means for executing the respective first level buffers for each of the plurality of views; and
means for displaying the rendered first annotation at the focal length.

18. The apparatus of claim 17, further comprising:
means for determining an updated distance to the object;
means for calculating an updated focal length for displaying the first annotation based on the updated distance; and
means for displaying the first annotation with the display at the updated focal length.

19. The apparatus of claim 17, wherein the rendered first annotation is stored in a multiview tile format, the apparatus further comprising:
means for converting the rendered first annotation from the multiview tile format to a light field tile format.

20. A computer-readable storage medium storing instructions that, when executed, cause one or more processors to:
determine a distance between a display and an object;
calculate a focal length for displaying a first annotation with the display based on the distance;
render the first annotation at a plurality of views based on the calculated focal length, wherein to render the first annotation, the instructions further cause the one or more processors to:
  receive a multiview viewport for the plurality of views,
  receive a model view projection for the plurality of views,
  generate a respective viewport for each respective view of the plurality of views,
  generate a respective model view projection for each respective view of the plurality of views,
  store first commands that are specific to each respective view of the plurality of views in a respective first level buffer for each respective view of the plurality of views,
  store second commands that are common to each respective view of the plurality of views in a second level buffer, wherein the first commands in the respective first level buffers call the second commands in the second level buffer, and
  execute the respective first level buffers for each of the plurality of views; and
display the rendered first annotation at the focal length.

21. The computer-readable storage medium of claim 20, wherein the instructions further cause the one or more processors to:

determine an updated distance to the object;

calculate an updated focal length for displaying the first annotation based on the updated distance; and display the first annotation with the display at the updated focal length.

22. The computer-readable storage medium of claim 20, wherein the rendered first annotation is stored in a multiview tile format, and wherein the instructions further cause the one or more processors to:

convert the rendered first annotation from the multiview tile format to a light field tile.

\* \* \* \* \*